(12) United States Patent
Falahati et al.

(10) Patent No.: US 12,375,222 B2
(45) Date of Patent: *Jul. 29, 2025

(54) SYSTEMS AND METHODS OF HARQ CODEBOOK DETERMINATION FOR MULTIPLE PUCCH

(71) Applicant: Telefonaktiebolaget LM Ericsson (publ), Stockholm (SE)

(72) Inventors: Sorour Falahati, Stockholm (SE); Robert Baldemair, Solna (SE); Ali Behravan, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/650,446

(22) Filed: Apr. 30, 2024

(65) Prior Publication Data

US 2024/0283579 A1  Aug. 22, 2024

Related U.S. Application Data

(63) Continuation of application No. 17/608,474, filed as application No. PCT/SE2020/050429 on Apr. 29, 2020, now Pat. No. 12,003,338.

(Continued)

(51) Int. Cl.
*H04L 5/00* (2006.01)
*H04L 1/1812* (2023.01)
(Continued)

(52) U.S. Cl.
CPC .......... *H04L 1/1861* (2013.01); *H04L 1/1812* (2013.01); *H04L 1/1896* (2013.01);
(Continued)

(58) Field of Classification Search
CPC ................. H04L 1/1861; H04L 1/1812; H04L 1/1896; H04L 5/0055; H04L 5/0082;
(Continued)

(56) References Cited

U.S. PATENT DOCUMENTS 11,832,275 B2 * 11/2023 Kim ..................... H04L 1/1854
2014/0161001 A1    6/2014 Gao et al.
(Continued)

FOREIGN PATENT DOCUMENTS

EP          4040696 A1    8/2022
WO      2020224969 A1   11/2020

OTHER PUBLICATIONS

Nokia, et al., "R1-1800745: Remaining aspects of NR CA," 3GPP TSG RAN WG1 Meeting AH 1801, Jan. 22-26, 2018, Vancouver, Canada, 6 pages.

(Continued)

*Primary Examiner* — Lan-Huong Truong
(74) *Attorney, Agent, or Firm* — Withrow & Terranova, PLLC

(57) ABSTRACT

Systems and methods of HARQ codebook determination for multiple PUCCH are disclosed. In some embodiments, a method performed by a base station for constructing a semi-static HARQ codebook for each of multiple PUCCH resources in an uplink slot, each of the multiple PUCCH resources carrying HARQ feedback for PDSCH transmissions within a certain downlink time interval. The base station, based on a TDRA table, determines a sub-TDRA table for each downlink time interval comprising entries of the TDRA table with a TDRA ending in the downlink time interval. This includes pruning each sub-TDRA table to remove entries with overlapping TDRAs. The semi-static HARQ codebook is constructed for each pruned sub-TDRA table based on the remaining entries in the pruned sub- (Continued)

TDRA tables. The semi-static HARQ codebook is transmitted to the wireless device. In this way, it is possible to construct a semi-static HARQ codebook for multiple PUCCH transmission within a slot.

20 Claims, 15 Drawing Sheets

Related U.S. Application Data

(60) Provisional application No. 62/843,027, filed on May 3, 2019.

(51) Int. Cl.
*H04L 1/1829* (2023.01)
*H04L 1/1867* (2023.01)

(52) U.S. Cl.
CPC .......... *H04L 5/0055* (2013.01); *H04L 5/0082* (2013.01); *H04L 5/0092* (2013.01)

(58) Field of Classification Search
CPC ..... H04L 5/0092; H04L 5/001; H04L 5/1469; H04L 1/1621; H04L 5/0023
See application file for complete search history.

(56) References Cited

U.S. PATENT DOCUMENTS

2021/0288757 A1* 9/2021 Jacobsen .............. H04B 7/0456
2022/0159692 A1* 5/2022 Lee ....................... H04L 5/0053

OTHER PUBLICATIONS

Examination Report for European Patent Application No. 20725251.1, mailed Jan. 27, 2023, 4 pages.
International Search Report and Written Opinion for International Patent Application No. PCT/SE2020/050429, mailed Jul. 13, 2020, 10 pages.
Notice of Allowance for U.S. Appl. No. 17/608,474, mailed Jan. 31, 2024, 11 pages.

* cited by examiner

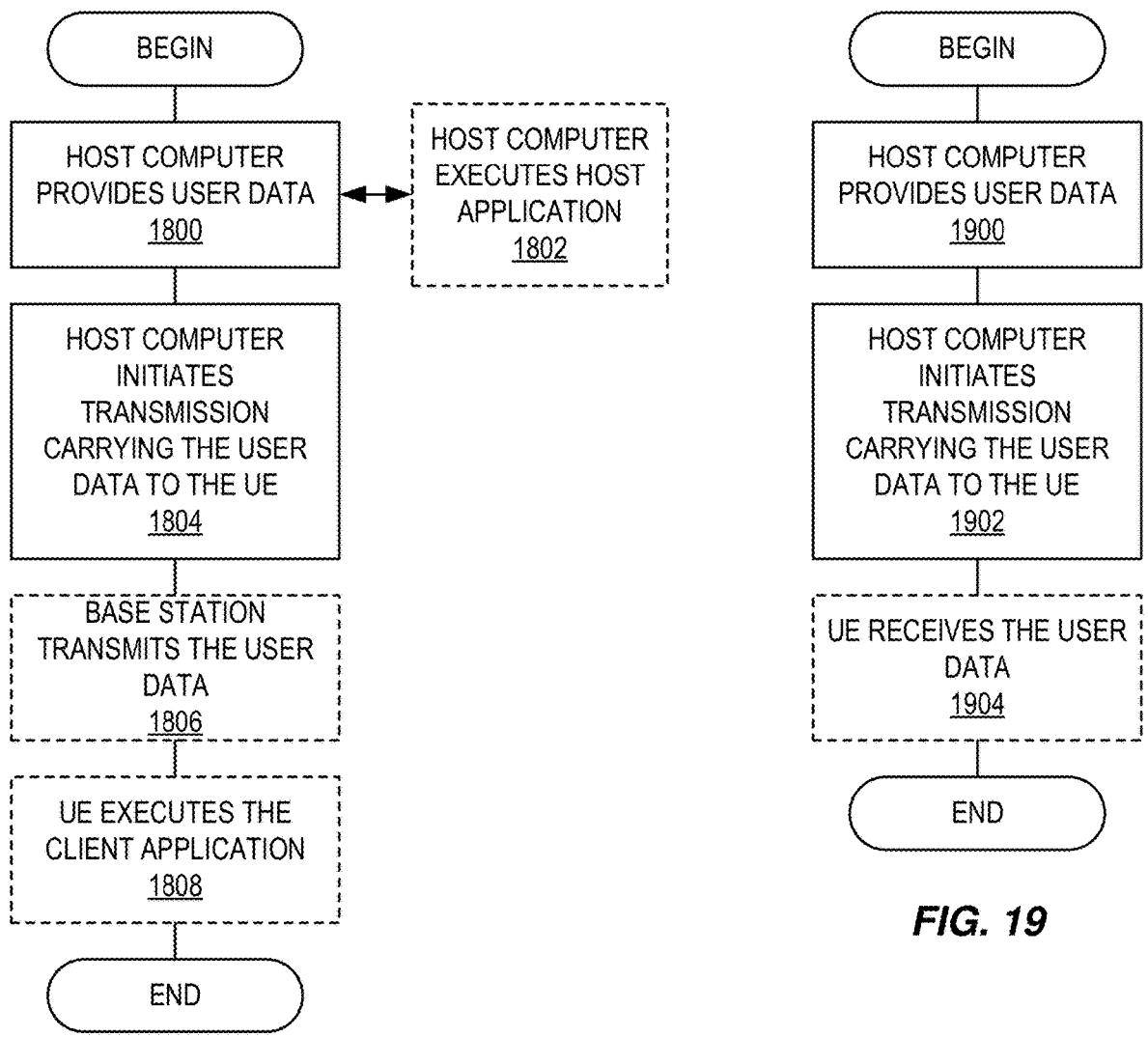

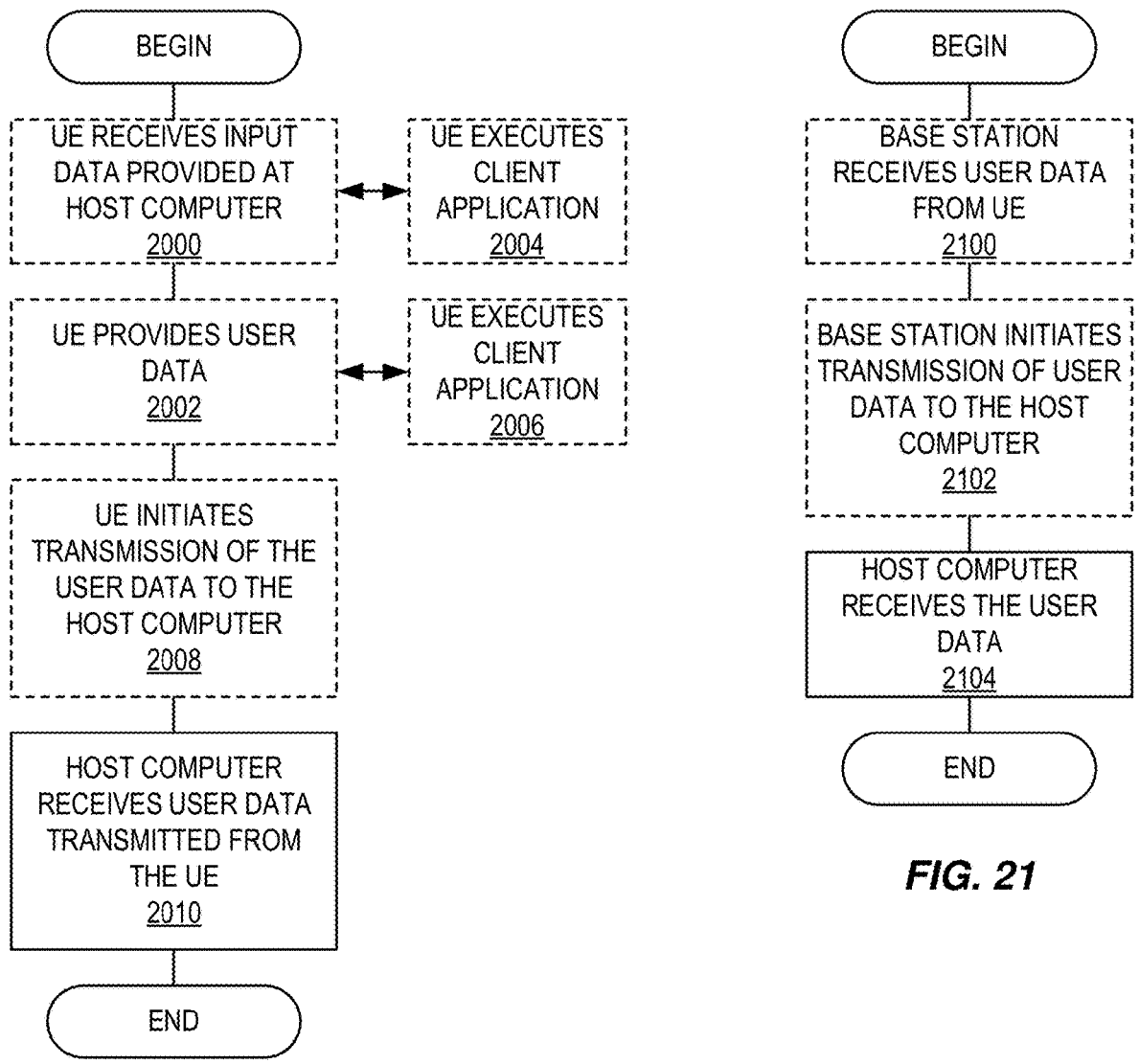

SYSTEMS AND METHODS OF HARQ CODEBOOK DETERMINATION FOR MULTIPLE PUCCH

RELATED APPLICATIONS

This application is a continuation of U.S. patent application Ser. No. 17/608,474, filed Nov. 2, 2021, now U.S. Pat. No. 12,003,338, which is a 35 U.S.C. 317 national phase filing of International Application No. PCT/SE2020/050429, filed Apr. 29, 2020, which claims the benefit of provisional patent application Ser. No. 62/843,027, filed May 3, 2019, the disclosures of which are hereby incorporated herein by reference in their entireties.

TECHNICAL FIELD

The current disclosure relates to determining a Hybrid Automatic Repeat Request (HARQ) codebook.

BACKGROUND

The New Radio (NR) standard in 3rd Generation Partnership Project (3GPP) is designed to provide service for multiple use cases such as enhanced Mobile Broadband (eMBB), Ultra-Reliable and Low Latency Communication (URLLC), and Machine Type Communication (MTC). Each of these services has different technical requirements. For example, the general requirement for eMBB is high data rate with moderate latency and moderate coverage, while URLLC service requires a low latency and high reliability transmission but perhaps for moderate data rates.

One of the solutions for low latency data transmission is shorter transmission time intervals. In NR, in addition to transmission in a slot, a mini-slot transmission is also allowed to reduce latency. A mini-slot is a concept that is used in scheduling, and in Downlink (DL) a mini-slot can consist of two, four, or seven Orthogonal Frequency Division Multiplexing OFDM symbols, while in Uplink (UL), a mini-slot can be any number of one to fourteen OFDM symbols. It should be noted that the concepts of slot and mini-slot are not specific to a service meaning that a mini-slot may be used for either eMBB, URLLC, or other services. FIG. 1 illustrates an exemplary radio resource in NR.

In the 3GPP NR standard, Downlink Control Information (DCI), which is transmitted in a Physical Downlink Control Channel (PDCCH), is used to indicate the DL data related information, UL related information, power control information, slot format indication, etc. There are different formats of DCI associated with each of these control signals, and the User Equipment (UE) identifies them based on different Radio Network Temporary Identifiers (RNTIs).

A UE is configured by higher layer signaling to monitor for DCIs in different resources with different periodicities, etc. DCI formats 1_0 and 1_1 are used for scheduling DL data which is sent in a physical downlink shared channel (PDSCH), and includes time and frequency resources for DL transmission, as well as modulation and coding information, HARQ (Hybrid Automatic Repeat Request) information, etc.

The procedure for receiving a downlink transmission is that the UE first monitors and decodes a PDCCH in slot n which points to a DL data scheduled in slot $n+K_0$ ($K_0$ is larger than or equal to 0). The UE then decodes the data in the corresponding PDSCH. Finally, based on the outcome of the decoding, the UE sends an acknowledgement of the correct decoding (ACK) or a negative acknowledgement (NACK) to the gNB at time slot $n+K_0+K_1$ (in case of slot aggregation $n+K_0$ would be replaced by the slot where PDSCH ends). Both of $K_0$ and $K_1$ are indicated in the downlink DCI. The resources for sending the acknowledgement are indicated by a Physical Uplink Control Channel (PUCCH) resource indicator (PRI) field in PDCCH which points to one of the PUCCH resources that are configured by higher layers.

Depending on DL/UL slot configurations or whether carrier aggregation or per code-block group (CBG) transmission is used in the DL, the feedback for several PDSCHs may need to be multiplexed in one feedback. This is done by constructing HARQ-ACK codebooks. In NR, the UE can be configured to multiplex the A/N bits using a semi-static codebook or a dynamic codebook.

A Type I or semi-static codebook consists of a bit sequence where each element contains the A/N bit from a possible allocation in a certain slot, carrier, or Transport Block (TB). When the UE is configured with CBG and/or Time-Domain Resource Allocation (TDRA) table with multiple entries, multiple bits are generated per slot and TB (see below). It is important to note that the codebook is derived regardless of the actual PDSCH scheduling. The size and format of the semi-static codebook is preconfigured based on the mentioned parameters. The drawback of the semi-static HARQ ACK codebook is that the size is fixed and regardless of whether there is a transmission or not a bit is reserved in the feedback matrix.

In the case when a UE has a TDRA table with multiple time-domain resource allocation entries configured, the table is pruned (i.e., entries are removed based on a specified algorithm) to derive a TDRA table that only contains non-overlapping time-domain allocations. One bit is then reserved in the HARQ codebook for each non-overlapping entry (assuming a UE is capable of supporting reception of multiple PDSCH in a slot).

To avoid reserving unnecessary bits in a semi-static HARQ codebook, in NR, a UE can be configured to use a Type II or dynamic HARQ codebook, where an A/N bit is present only if there is a corresponding transmission scheduled. To avoid any confusion between the gNB and the UE on the number of PDSCHs that the UE has to send a feedback for, a counter Downlink Assignment Indicator (DAI) field exists in a DL assignment. The DAI field denotes an accumulative number of serving cells and PDCCH occasion pairs in which a PDSCH is scheduled to a UE up to the current PDCCH. In addition to that, there is another field called total DAI, which when present shows the total number of serving cells PDCCH occasion pairs up to (and including) all PDCCHs of the current PDCCH monitoring occasion. The timing for sending HARQ feedback is determined based on both the PDSCH transmission slot with reference to PDCCH slot ($K_0$) and the PUCCH slot that contains HARQ feedback ($K_1$).

FIG. 2 illustrates the timeline in a simple scenario with two PDSCHs and one feedback. In this example, there are in total four PUCCH resources configured, and the PRI indicates PUCCH 2 to be used for HARQ feedback.

Problems with Existing Solutions

There currently exist certain challenge(s). It has been agreed that in order to provide low latency communication in NR, multiple PUCCHs within a slot are supported to allow faster HARQ feedback. A UL slot is divided into sub-slots, and a PUCCH is transmitted within a sub-slot. In this case, a HARQ-code book may be generated for each PUCCH transmission in a slot corresponding to one or more PDSCH transmission. The existing methods describe the procedure for constructing at most one HARQ-code book per slot. That includes the case when a UE is subject to transmission of the semi-static or Type I HARQ code book.

This can be better explained with an example where 3 DL slots are followed by a UL slot and each UL slot is divided into two sub-slots where each sub-slot in a UL slot consists of 7 symbols.

As Illustrated in FIG. 3 and FIG. 4 for dynamic (Type II) or semi-static (Type I) HARQ codebooks, respectively, the feedback of all the 6 PDSCHs shown in the figures can be carried by PUCCH1 or PUCCH2, depending on the corresponding $K_1$ values and the required processing time.

As Illustrated in FIG. 3, assuming that all the PDSCHs are present based on the last DCI rule and considering the required processing time, PUCCH1 can carry the HARQ-ACK feedback for PDSCH1 to PDSCH5, while PUCCH2 can carry the HARQ-ACK feedback for the last PDSCH, i.e., PDSCH6. Clearly, there is an unbalanced distribution of the payload size on these two PUCCH resources, and the resources are utilized inefficiently.

As Illustrated in FIG. 4 for the semi-static HARQ codebook (or Type I HARQ codebook), the possible $K_1$ values (that is in units of sub-slot) corresponding to PUCCH1 and PUCCH2 for PDSCH1 to PDSCH6 would be {6, 5, 4, 3, 2, 1} and {7, 6, 5, 4, 3, 2}, respectively. Considering the difference between the maximum and minimum values between possible $K_1$ values corresponding to each PUCCH, the code-books corresponding to each PUCCH include 5 and 6 entries based on $K_1$ values with clear overlap in associated PDSCHs and consequent overhead in the code-books (a PDSCH is only reported in one HARQ codebook and the corresponding bit in the other HARQ codebook is set to NACK).

Therefore, the existing algorithm for constructing the Type I HARQ codebook which is based on possible time domain resource allocations in a DL slot as well as possible timing for PUCCH transmission based on configured $K_1$ values, cannot be directly used for sub-slot PUCCH design.

SUMMARY

Systems and methods of Hybrid Automatic Repeat Request (HARQ) codebook determination for multiple Physical Uplink Control Channel (PUCCH) are disclosed. In some embodiments, a method performed by a base station for constructing, for a wireless device, a semi-static HARQ codebook for each of multiple PUCCH resources in an uplink slot, each of the multiple PUCCH resources carrying HARQ feedback for Physical Downlink Shared Channel (PDSCH) transmissions within a certain downlink time interval, according to some embodiments of the present disclosure. The base station, based on a Time Domain Resource Allocation (TDRA) table comprising a list of TDRA entries configured for the wireless device, determines a sub-TDRA table for each downlink time interval comprising entries of the TDRA table with a TDRA ending in the downlink time interval. In some embodiments, this includes pruning each sub-TDRA table to remove entries with overlapping TDRAs. The base station constructs a semi-static HARQ codebook for each pruned sub-TDRA table based on the remaining entries in the pruned sub-TDRA tables. In some embodiments, the base station transmits the semi-static HARQ codebook to a wireless device. In this way, it is possible to construct a semi-static HARQ codebook for multiple PUCCH transmission within a slot.

In some embodiments, a method performed by a wireless device for enabling feedback for multiple data channels includes: receiving, from a base station, a semi-static HARQ codebook for each of multiple PUCCH resources in an uplink slot, each of the multiple PUCCH resources carrying HARQ feedback for PDSCH transmissions within a certain downlink time interval. In some embodiments, the semi-static HARQ codebook includes: based on the TDRA table comprising a list of TDRA entries configured for the wireless device, a sub-TDRA table for each downlink time interval comprises entries of the TDRA table with a TDRA ending in the downlink time interval; and each sub-TDRA table is pruned to remove entries with overlapping TDRAs. In some embodiments, the wireless device transmits, to the base station, feedback for multiple data channels based on the semi-static HARQ codebook. In this way, it is possible to use a semi-static HARQ codebook for multiple PUCCH transmission within a slot.

In some embodiments, the method also includes reserving one bit in the semi-static HARQ codebook for each remaining entry. In some embodiments, the method also includes reserving multiple bits in the semi-static HARQ codebook based on multiple Transport Blocks (TBs) and Code-Block Groups (CBGs).

In some embodiments, pruning each sub-TDRA table comprises: for DL slots that are only overlapped by one DL time interval, the TDRA table pruning algorithm as in Rel-15 can be applied pruning each sub-TDRA table.

In some embodiments, constructing the semi-static HARQ codebook comprises constructing the semi-static HARQ codebook based on data channel correspondence to multiple feedback channel transmissions in the slot.

In some embodiments, constructing the semi-static HARQ codebook further comprises dividing the data channels that can be acknowledged within a slot into multiple groups each corresponding to one Uplink (UL) sub-slot for a feedback channel transmission that is used to carry the corresponding HARQ feedback.

In some embodiments, the method also includes, for a number of X UL sub-slots, indicating, to the wireless device, X DL time intervals by higher layer configurations. In some embodiments, the method also includes, for a number of X UL sub-slots, Indicating, to the wireless device, X DL time intervals by dynamic signaling in a downlink control information, DCI. In some embodiments, the method also includes, for a number of X UL sub-slots, indicating, to the wireless device, X DL time intervals by implicit rules. In some embodiments, the implicit rules comprise X equal DL durations for the DL slots in a TDD configuration.

Certain aspects of the present disclosure and their embodiments may provide solutions to the aforementioned or other challenges. According to certain aspects, methods of constructing a semi-static HARQ codebook for multiple PUCCH transmissions within a slot are provided. Some embodiments of the current disclosure include:

Determining PDSCH-to-HARQ_feedback timing indicators ($K_1$) used in the construction for a HARQ codebook; and/or Constructing a semi-static HARQ codebook based on PDSCH correspondence to multiple PUCCH transmissions in a slot.

These embodiments can be applied independently (i.e., each can be applied stand-alone) or can also be combined when constructing a HARQ codebook.

There are, proposed herein, various embodiments which address one or more of the issues disclosed herein. In some embodiments, a method performed by a base station for enabling feedback for multiple channels includes determining a timing indicator to map a data channel to a feedback channel used in the construction for a HARQ codebook; and/or constructing a semi-static HARQ codebook based on a data channel correspondence to multiple feedback channel transmissions in a slot.

In some embodiments, determining the timing indicator comprises determining a PDSCH-to-HARQ_feedback timing indicator ($K_1$) used in the construction for a HARQ codebook. In some embodiments, constructing the semi-static HARQ codebook comprises constructing the semi-static HARQ codebook based on PDSCH correspondence to multiple PUCCH transmissions in the slot. In some embodiments, determining the timing indicator comprises determining the timing indicator based on splitting the PDSCHs into multiple groups corresponding to multiple PUCCHs. In some embodiments, the PDSCHs that can be acknowledged within a slot are divided into multiple groups each corresponding to one UL sub-slot for a PUCCH transmission that is used to carry the corresponding HARQ feedback.

In some embodiments, the $K_1$ values associated with a PUCCH in a sub-slot are determined based on the assigned PUCCH for each of the PDSCH groups. In some embodiments, for Type I HARQ codebooks, the difference between possible maximum and minimum $K_1$ values for PDSCHs in each group is used to determine the size of the codebook for a PUCCH transmission in a corresponding UL sub-slot. In some embodiments, for a number of X UL sub-slots, X DL time intervals are indicated to the wireless device by higher layer configurations.

In some embodiments, for a number of X UL sub-slots, X DL time intervals are indicated to the wireless device by implicit rules such as X equal DL durations for the DL slots in a Time Division Duplexing (TDD) configuration. In some embodiments, the set of $K_1$ values for a PUCCH is derived based on the ending time of a DL time interval and the sub-slot position of the associated PUCCH. In some embodiments, for the number of X UL sub-slots, X sets of $K_1$ values each corresponding to one UL sub-slot are indicated to the wireless device by higher layer configurations. In some embodiments, for the number of X UL sub-slots, X sets of $K_1$ values, each corresponding to one UL sub-slot are indicated to the wireless device by implicit rules such as all the possible $K_1$ values are divided into X sets where each set includes a number of $K_1$ values with consecutive $K_1$ values in each set. In some embodiments, the number of $K_1$ values in a set is based on the rule, e.g., (almost) same number of $K_1$ values in all sub-slots). In some embodiments, depending on the value of X, the first or last set can have smaller size as compared to the other sets.

In some embodiments, constructing the semi-static HARQ codebook comprises constructing the semi-static HARQ codebook based on PDSCHs in groups corresponding to multiple PUCCH transmissions in a slot. In some embodiments, the wireless device could have a TDRA table with more than two time-domain resource allocation entries, and some of the time-domain resource allocations may overlap with each other. In some embodiments, for the DL slot(s) which PDSCHs are acknowledged in different UL sub-slots, the TDRA table is pruned before the HARQ codebook for a PUCCH is constructed.

In some embodiments, assuming the DL slot is overlapped by two or more DL time intervals that are associated with different PUCCH, for each of the overlapping DL time intervals (and thus for the associated PUCCH), only time-domain resource allocations ending in this DL time interval are considered, resulting in a sub-TDRA table for each DL time interval; and the sub-TDRA table is then pruned to remove entries with overlapping time-domain resource allocations, and one bit is then reserved in the HARQ codebook for each remaining entry (multiple bits based on multiple TBs and CBG come on top of that).

In some embodiments, for DL slots that are only overlapped by one DL time interval (i.e., all PDSCH within this DL slot are acknowledged in the same PUCCH), the TDRA table pruning algorithm as in Rel-15 can be applied. In some embodiments, the timing indicator is in units of sub-slots.

Certain embodiments may provide one or more of the following technical advantage(s): The methods described here make it possible to construct semi-static HARQ codebook for multiple PUCCH transmission within a slot.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 18-21 are flowcharts illustrating methods implemented in a communication system, according to some embodiments of the present disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 5:
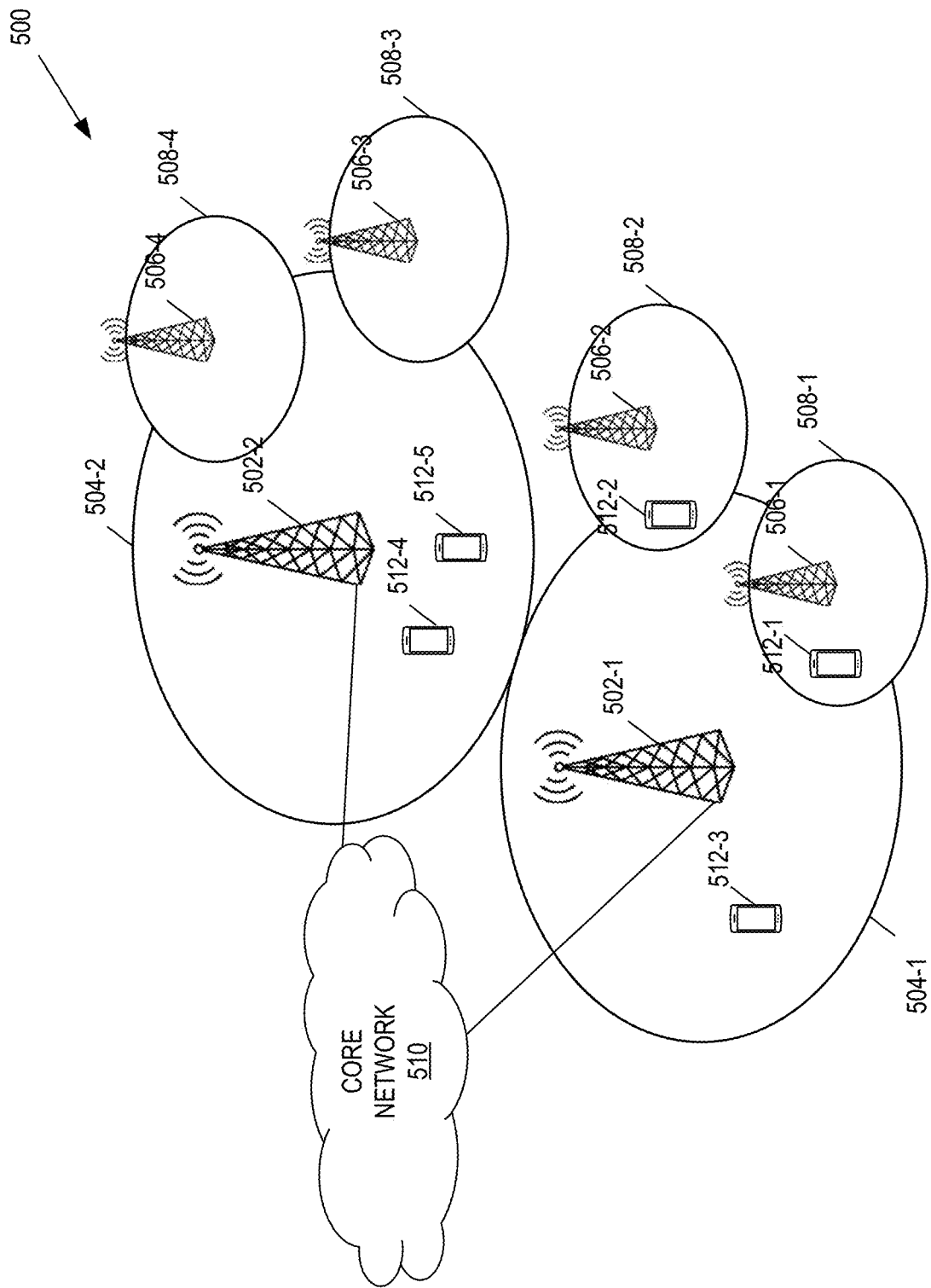
FIG. 5 illustrates one example of a cellular communications network according to some embodiments of the present disclosure.

FIG. 5 illustrates one example of a cellular communications network 500 according to some embodiments of the present disclosure. In the embodiments described herein, the cellular communications network 500 is a 5G NR network. In this example, the cellular communications network 500 includes base stations 502-1 and 502-2, which in LTE are referred to as eNBs and in 5G NR are referred to as gNBs, controlling corresponding macro cells 504-1 and 504-2. The base stations 502-1 and 502-2 are generally referred to herein collectively as base stations 502 and individually as base station 502. Likewise, the macro cells 504-1 and 504-2 are generally referred to herein collectively as macro cells 504 and individually as macro cell 504. The cellular communications network 500 may also include a number of low power nodes 506-1 through 506-4 controlling corresponding small cells 508-1 through 508-4. The low power nodes 506-1 through 506-4 can be small base stations (such as pico or femto base stations) or Remote Radio Heads (RRHs), or the like. Notably, while not illustrated, one or more of the small cells 508-1 through 508-4 may alternatively be provided by the base stations 502. The low power nodes 506-1 through 506-4 are generally referred to herein collectively as low power nodes 506 and individually as low power node 506. Likewise, the small cells 508-1 through 508-4 are generally referred to herein collectively as small cells 508 and individually as small cell 508. The base stations 502 (and optionally the low power nodes 506) are connected to a core network 510.

The base stations 502 and the low power nodes 506 provide service to wireless devices 512-1 through 512-5 in the corresponding cells 504 and 508. The wireless devices 512-1 through 512-5 are generally referred to herein collectively as wireless devices 512 and individually as wireless device 512. The wireless devices 512 are also sometimes referred to herein as User Equipments (UEs).

According to some embodiments of the current disclosure, a Physical Downlink Shared Channel (PDSCH)-to-Hybrid Automatic Repeat Request (HARQ)_feedback timing indicator ($K_1$) is determined based on splitting the PDSCHs into multiple groups corresponding to multiple Physical Uplink Control Channels (PUCCHs). The PDSCHs that can be acknowledged within a slot are divided into multiple groups each corresponding to one Uplink (UL) sub-slot for a PUCCH transmission that is used to carry the corresponding HARQ feedback. The $K_1$ values associated with a PUCCH in the sub-slot are then determined (in units of the sub-slot) based on the assigned PUCCH for each of the PDSCH groups. For Type I HARQ codebooks, the difference between possible maximum and minimum $K_1$ values for PDSCHs in each group is used to determine the size of the codebook for a PUCCH transmission in a corresponding UL sub-slot. In some embodiments, the size of a codebook is determined based on both of the following: the maximum and minimum of $K_1$ value; and all of the possible non-overlapping time-domain resource allocations within the corresponding PDSCH group.

Figures 6, 7:
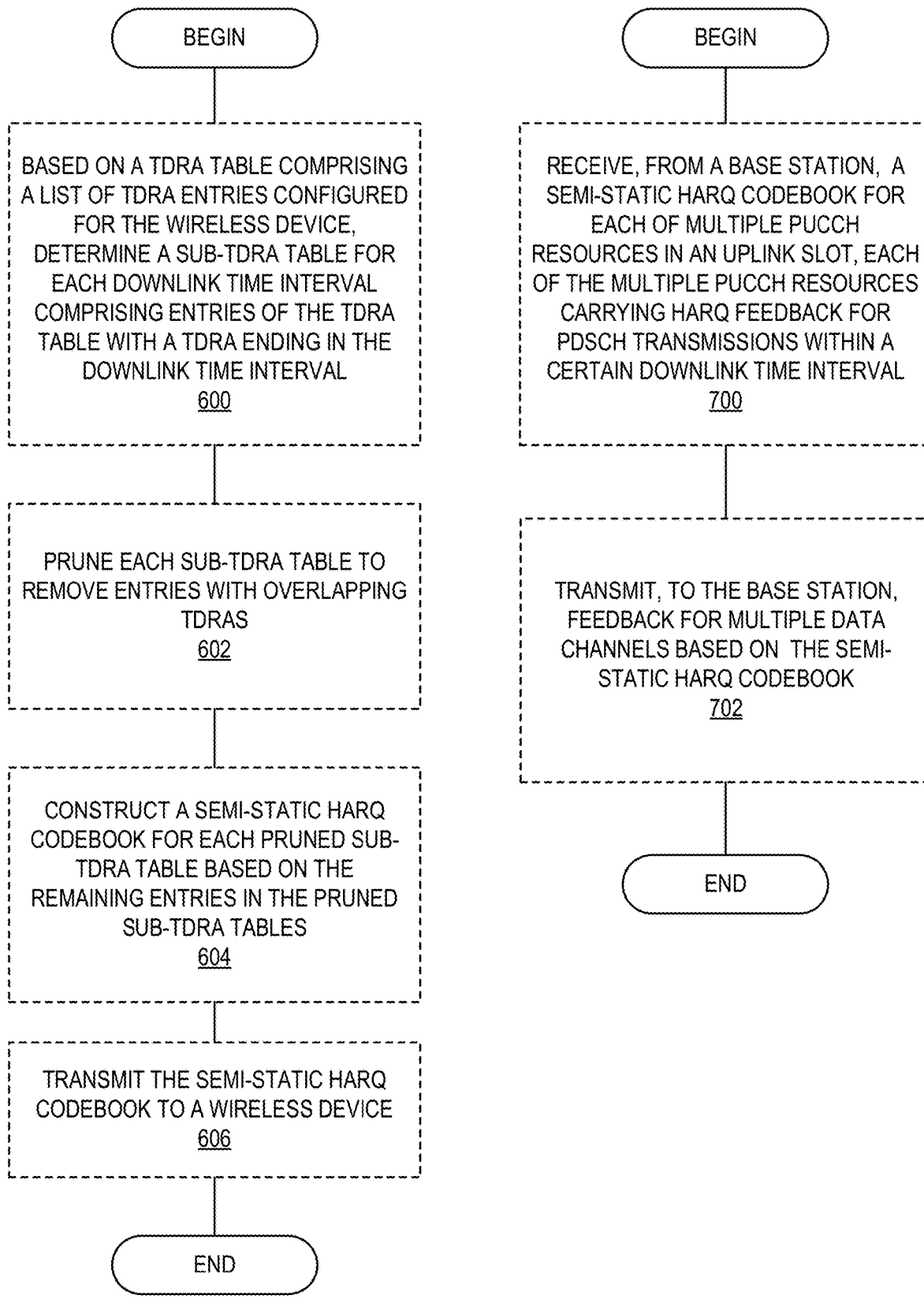
FIG. 6 illustrates a method performed by a base station for enabling feedback for multiple data channels, according to some embodiments of the present disclosure.
FIG. 7 illustrates a method performed by a wireless device for enabling feedback for multiple data channels, according to some embodiments of the present disclosure.

FIG. 6 illustrates a method performed by a base station for constructing, for a wireless device, a semi-static HARQ codebook for each of multiple PUCCH resources in an uplink slot, each of the multiple PUCCH resources carrying HARQ feedback for PDSCH transmissions within a certain downlink time interval, according to some embodiments of the present disclosure. The base station, based on a Time Domain Resource Allocation (TDRA) table comprising a list of TDRA entries configured for the wireless device, determines a sub-TDRA table for each downlink time interval comprising entries of the TDRA table with a TDRA ending in the downlink time interval (step 600). In some embodiments, this includes pruning each sub-TDRA table to remove entries with overlapping TDRAs (step 602). The base station constructs a semi-static HARQ codebook for each pruned sub-TDRA table based on the remaining entries in the pruned sub-TDRA tables (step 604). In some embodiments, the base station transmits the semi-static HARQ codebook to a wireless device (step 606). In this way, it is possible to construct a semi-static HARQ codebook for multiple PUCCH transmission within a slot.

FIG. 7 illustrates a method performed by a wireless device (1400) for enabling feedback for multiple data channels, according to some embodiments of the present disclosure. The wireless device receives, from a base station, a semi-static HARQ codebook for each of multiple PUCCH resources in an uplink slot, each of the multiple PUCCH resources carrying HARQ feedback for PDSCH transmissions within a certain downlink time interval (step 700). In some embodiments, the semi-static HARQ codebook includes: based on the TDRA table comprising a list of TDRA entries configured for the wireless device, a sub-TDRA table for each downlink time interval comprises entries of the TDRA table with a TDRA ending in the downlink time interval; and each sub-TDRA table is pruned to remove entries with overlapping TDRAs. In some embodiments, the wireless device transmits, to the base station, feedback for multiple data channels based on the semi-static HARQ codebook (step 702). In this way, it is possible to use a semi-static HARQ codebook for multiple PUCCH transmissions within a slot.

Figure 1:
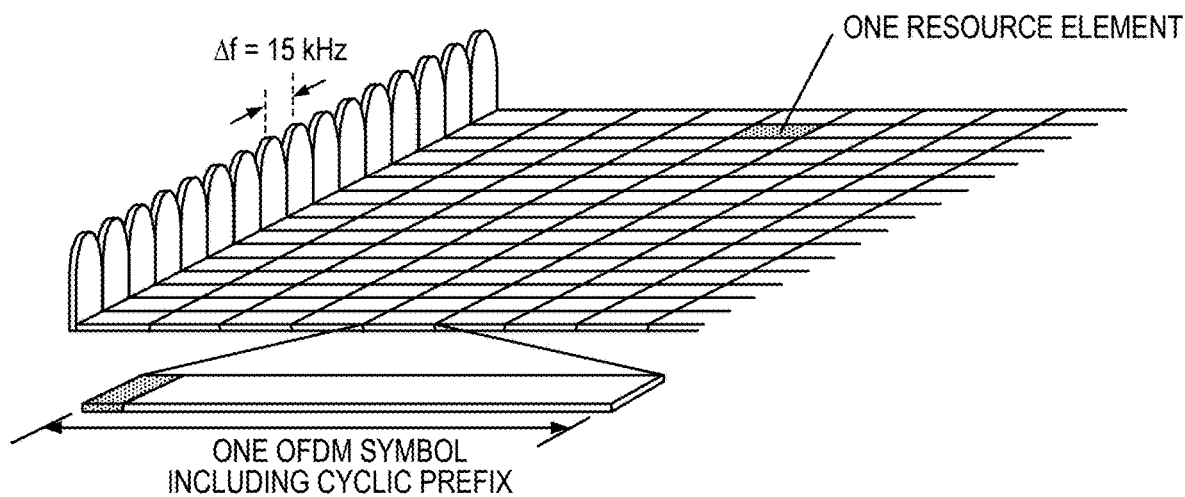
FIG. 1 illustrates an exemplary radio resource in New Radio (NR), according to some embodiments of the present disclosure.
Figure 2:
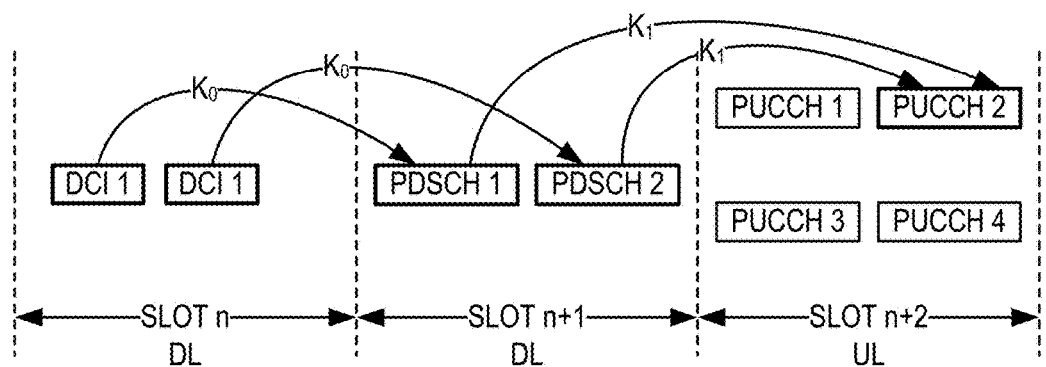
FIG. 2 illustrates a timeline in a simple scenario with two Physical Downlink Shared Channels (PDSCHs) and one feedback, according to some embodiments of the present disclosure.
Figure 3:
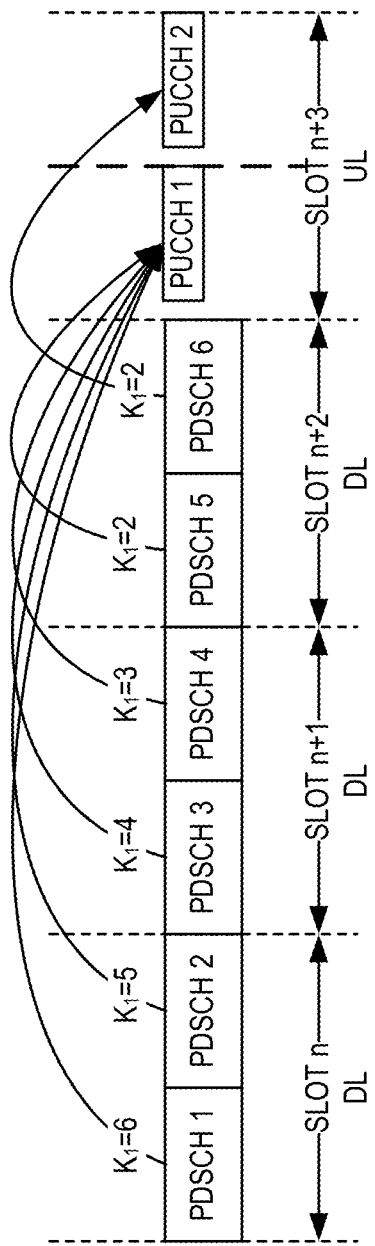
FIG. 3 illustrates $K_1$ indication for two Physical Uplink Control Channels (PUCCHs) that carry the Hybrid Automatic Repeat Request (HARQ) feedback of three Downlink (DL) slots without grouping of PDSCHs based on a boundary in DL slots, according to some embodiments of the present disclosure.
Figure 4:
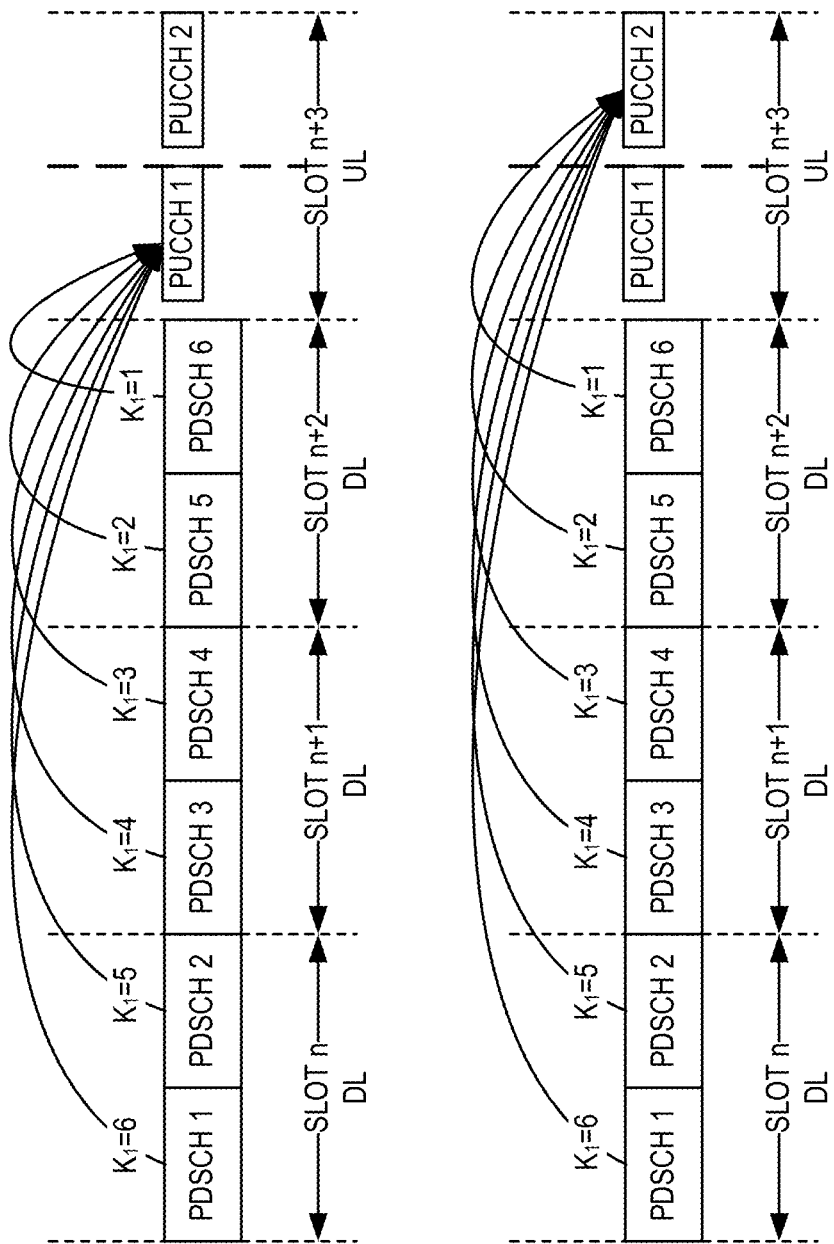
FIG. 4 illustrates $K_1$ indication for two PUCCHs that carry the HARQ feedback of three DL slots without grouping of PDSCHs based on a boundary in DL slots, according to some embodiments of the present disclosure.
Figure 8:
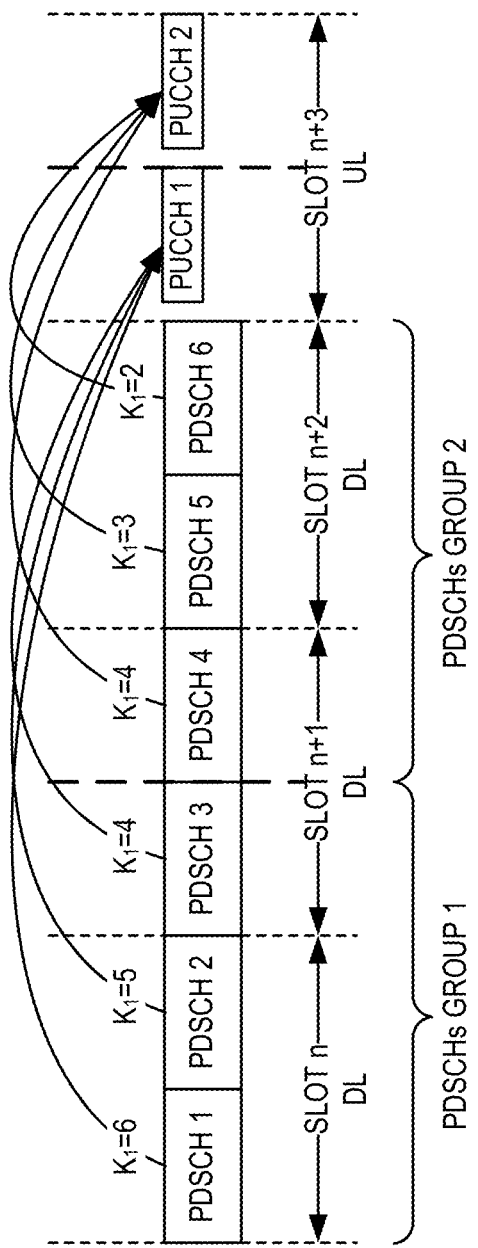
FIG. 8 illustrates how this method resolves the shortcomings of the example shown in FIG. 4, according to some embodiments of the present disclosure.

FIG. 8 illustrates how this method resolves the shortcomings of the example shown in FIG. 4. As shown here, the three DL slots are divided into two parts; for example, with the same durations, each 1.5 DL slots long. The group of PDSCHs in three DL slots is divided into two groups, PDSCH group 1 and PDSCH group 2. This division corresponds to the two PUCCHs in the UL slot which carry the HARQ feedback of each of the two PDSCH groups. The PDSCH-to-HARQ_feedback indications (which are in units of sub-slots) in this case are spilt based on the boundary of the PDSCH grouping. In other words, with two PUCCHs and the corresponding division of the PDSCHs into two groups, the $K_1$ values for the first PDSCH group are 6, 5, 4; and $K_1$ values for the second PDSCH group are 4, 3, and 2. Hence, each code-book would have three entries based on $K_1$ values without overlapping between PDSCHs.

In one example, for the number of X UL sub-slots, X DL time intervals are indicated to the UE by higher layer configurations or implicit rules such as X equal DL durations for the DL slots in a Time Division Duplexing (TDD) configuration. Based on the ending time of a DL time interval and the sub-slot position of the associated PUCCH, the set of $K_1$ values for that PUCCH is derived.

Figure 9:
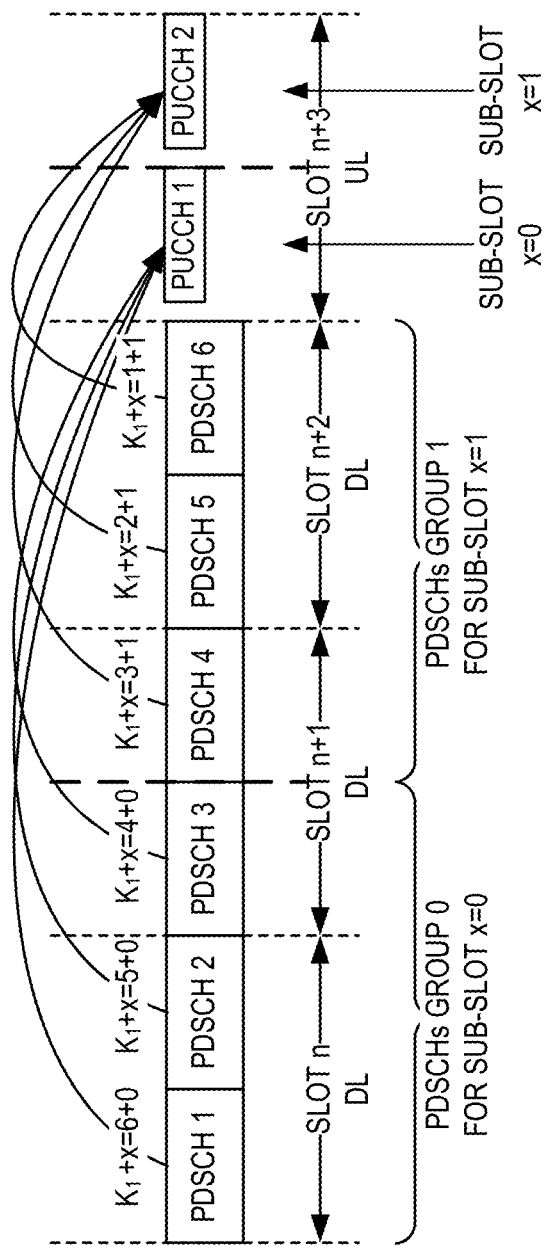
FIG. 9 illustrates $K_1$ indication for two PUCCHs that carry the HARQ feedback of three DL slots with grouping of PDSCHs based on a $K_1$ and sub-slot index, according to some embodiments of the present disclosure.

In another example, the number of X UL sub-slots and X sets of $K_1$ values each corresponding to one UL sub-slot are indicated to the UE by higher layer configurations or by implicit rules, such as, all the possible $K_1$ values are divided into X sets where each set includes a number of $K_1$ values, for example, with consecutive $K_1$ values in each set (the number of $K_1$ values in a set is based on the rule, e.g., (almost) same number of $K_1$ values in all sub-slots). Depending on the X, the first or last set can have a smaller size as compared to the other sets. An example is illustrated in FIG. 9, which illustrates $K_1$ indication for two PUCCHs that carry the HARQ feedback of three DL slots with grouping of PDSCHs based on a $K_1$ and sub-slot index, according to some embodiments of the present disclosure.

Some other embodiments of the current disclosure include a method of constructing semi-static HARQ codebook based on PDSCHs in groups corresponding to multiple PUCCH transmissions in a slot. In the example in FIG. 4, it can be seen that the UE has two PDSCH possibilities (based on the configured TDRA table) in slot n+1 and acknowledges the first PDSCH in PUCCH 1 and the second PDSCH in PUCCH 2. More generally, the UE could have a TDRA table with more than two time-domain resource allocation entries, and some of the time-domain resource allocations may overlap with each other. For the DL slot(s) in which PDSCHs are acknowledged in different UL sub-slots, the TDRA table is pruned before the HARQ codebook for a PUCCH is constructed.

In the following one example of such a pruning algorithm is provided: Assume the DL slot is overlapped by two or more DL time intervals that are associated with different PUCCHs (compare with embodiment above "In one example, for the number of X UL sub-slots, X DL time intervals are indicated to the UE . . . "). For each of the overlapping DL time intervals (and thus for the associated PUCCH) only time-domain resource allocations ending in this DL time interval are considered, resulting in a sub-TDRA table for each DL time interval. The sub-TDRA table is then pruned to remove entries with overlapping time-domain resource allocations, and one bit is then reserved in the HARQ codebook for each remaining entry (multiple bits based on multiple TBs and CBGs come on top of that).

For DL slots, such as slot n in FIG. 8, that are only overlapped by one DL time interval (i.e., all PDSCH within this DL slot are acknowledged in the same PUCCH) the TDRA table pruning algorithm as in Rel-15 can be applied.

Figure 10:
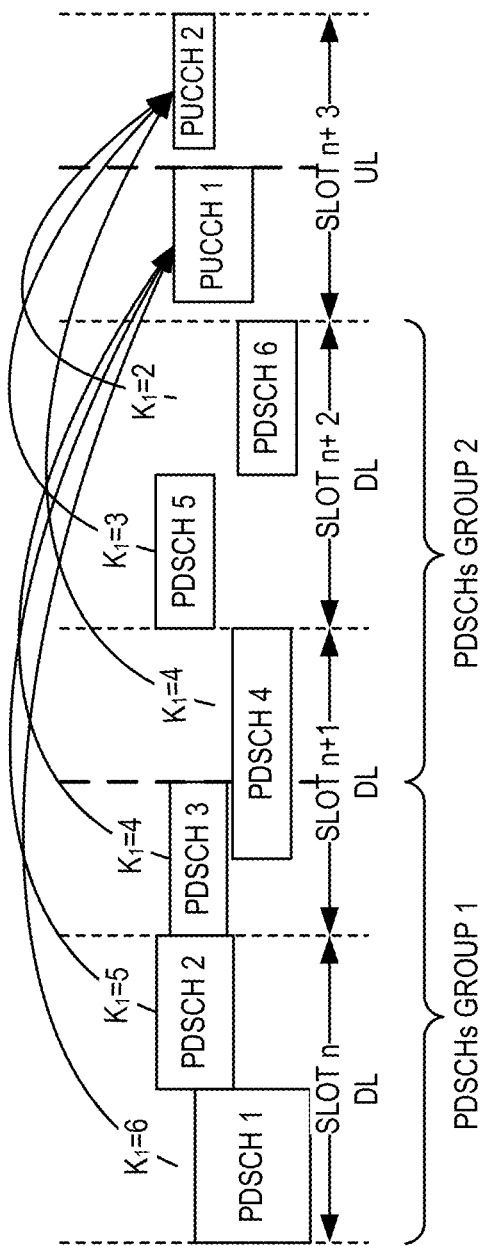
FIG. 10 illustrates an example where PDSCH TDRAs are allowed to overlap, according to some embodiments of the present disclosure.

FIG. 10 illustrates an example where PDSCH TDRAs are allowed to overlap, according to some embodiments of the present disclosure. In this example, PDSCH TDRAs in slot n and n+2 are not allowed to overlap in time since each of these slots are in a same PDSCH group (slot n in PDSCH group 1 and slot n+2 in PDSCH group 2) which means that PDSCH transmissions are acknowledged in the same PUCCH resource. All overlapping TDRAs in these slots need to be pruned before constructing the HARQ codebook. However, in slot n+1, it is allowed to have overlapping TDRAs since the first part (or sub-slot) of slot n+1 belongs to PDSCH group 1 while the second part of slot n+1 belongs to PDSCH group 2. TDRA of PDSCH3 ending in the first part of the slot is acknowledged in PUCCH1 and TDRA of PDSCH4 ending in the second part of the slot is acknowledged in PUCCH2, so it is OK to let the two TDRA overlap. As PUCCH1 and PUCCH2 correspond to different semi-static codebooks, these overlapping TDRAs need not be pruned before constructing the HARQ codebook.

Figure 11:
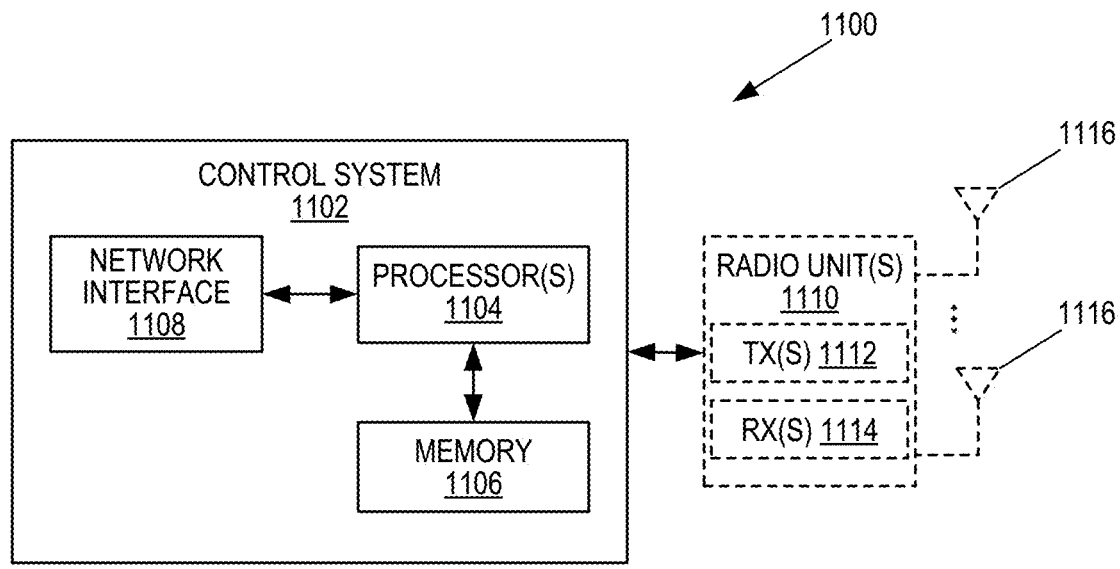
FIG. 11 is a schematic block diagram of a radio access node according to some embodiments of the present disclosure.

FIG. 11 is a schematic block diagram of a radio access node 1100 according to some embodiments of the present disclosure. Optional features are represented by dashed boxes. The radio access node 1100 may be, for example, a base station 502 or 506 or a network node that implements all or part of the functionality of the base station 502 or gNB described herein. As illustrated, the radio access node 1100 includes a control system 1102 that includes one or more processors 1104 (e.g., Central Processing Units (CPUs), Application Specific Integrated Circuits (ASICs), Field Programmable Gate Arrays (FPGAs), and/or the like), memory 1106, and a network interface 1108. The one or more processors 1104 are also referred to herein as processing circuitry. In addition, the radio access node 1100 may include one or more radio units 1110 that each includes one or more transmitters 1112 and one or more receivers 1114 coupled to one or more antennas 1116. The radio units 1110 may be referred to or be part of radio interface circuitry. In some embodiments, the radio unit(s) 1110 is external to the control system 1102 and connected to the control system 1102 via, e.g., a wired connection (e.g., an optical cable). However, in some other embodiments, the radio unit(s) 1110 and potentially the antenna(s) 1116 are integrated together with the control system 1102. The one or more processors 1104 operate to provide one or more functions of a radio access node 1100 as described herein. In some embodiments, the function(s) are implemented in software that is stored, e.g., in the memory 1106 and executed by the one or more processors 1104.

Figure 12:
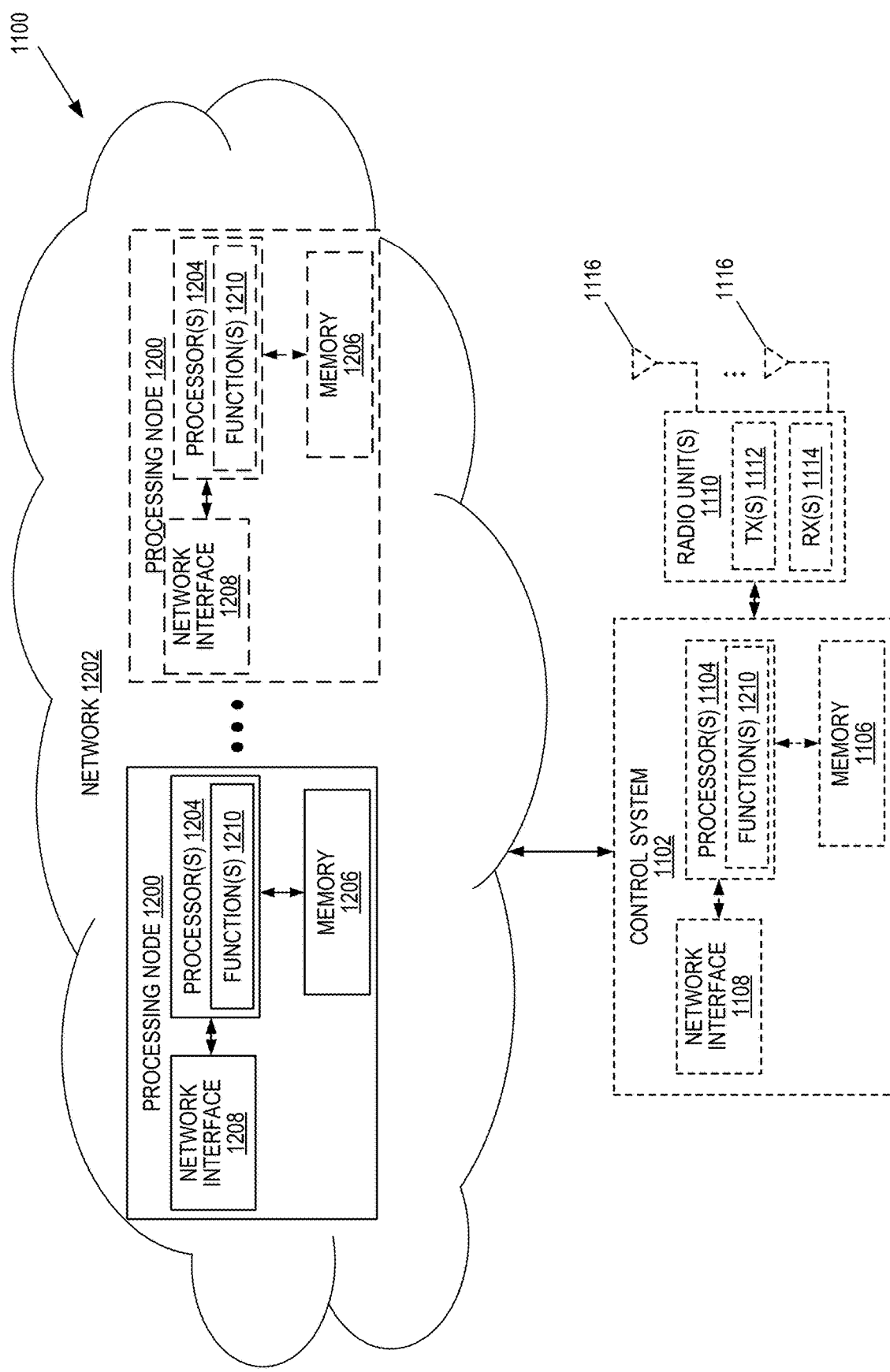
FIG. 12 is a schematic block diagram that illustrates a virtualized embodiment of the radio access node according to some embodiments of the present disclosure.

FIG. 12 is a schematic block diagram that illustrates a virtualized embodiment of the radio access node 1100 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1100 in which at least a portion of the functionality of the radio access node 1100 is implemented as a virtual component(s) (e.g., via a virtual machine(s) executing on a physical processing node(s) in a network(s)). As illustrated, in this example, the radio access node 1100 may include the control system 1102 and/or the one or more radio units 1110, as described above. The control system 1102 may be connected to the radio unit(s) 1110 via, for example, an optical cable or the like. The radio access node 1100 includes one or more processing nodes 1200 coupled to or included as part of a network(s) 1202. If present, the control system 1102 or the radio unit(s) is connected to the processing node(s) 1200 via the network 1202. Each processing node 1200 includes one or more processors 1204 (e.g., CPUs, ASICs, FPGAs, and/or the like), memory 1206, and a network interface 1208.

In this example, functions 1210 of the radio access node 1100 described herein are implemented at the one or more processing nodes 1200 or distributed across the one or more processing nodes 1200 and the control system 1102 and/or the radio unit(s) 1110 in any desired manner. In some particular embodiments, some or all of the functions 1210 of the radio access node 1100 described herein are implemented as virtual components executed by one or more virtual machines implemented in a virtual environment(s) hosted by the processing node(s) 1200. As will be appreciated by one of ordinary skill in the art, additional signaling or communication between the processing node(s) 1200 and the control system 1102 is used in order to carry out at least some of the desired functions 1210. Notably, in some embodiments, the control system 1102 may not be included, in which case the radio unit(s) 1110 communicates directly with the processing node(s) 1200 via an appropriate network interface(s).

In some embodiments, a computer program including instructions which, when executed by at least one processor, causes the at least one processor to carry out the functionality of radio access node 1100 or a node (e.g., a processing node 1200) implementing one or more of the functions 1210 of the radio access node 1100 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
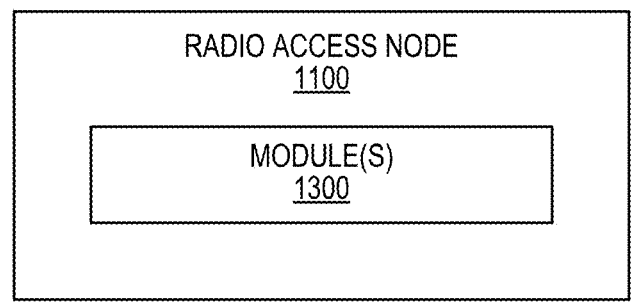
FIG. 13 is a schematic block diagram of the radio access node according to some other embodiments of the present disclosure.

FIG. 13 is a schematic block diagram of the radio access node 1100 according to some other embodiments of the present disclosure. The radio access node 1100 includes one or more modules 1300, each of which is implemented in software. The module(s) 1300 provide the functionality of the radio access node 1100 described herein. This discussion is equally applicable to the processing node 1200 of FIG. 12 where the modules 1300 may be implemented at one of the processing nodes 1200 or distributed across multiple processing nodes 1200 and/or distributed across the processing node(s) 1200 and the control system 1102.

Figure 14:
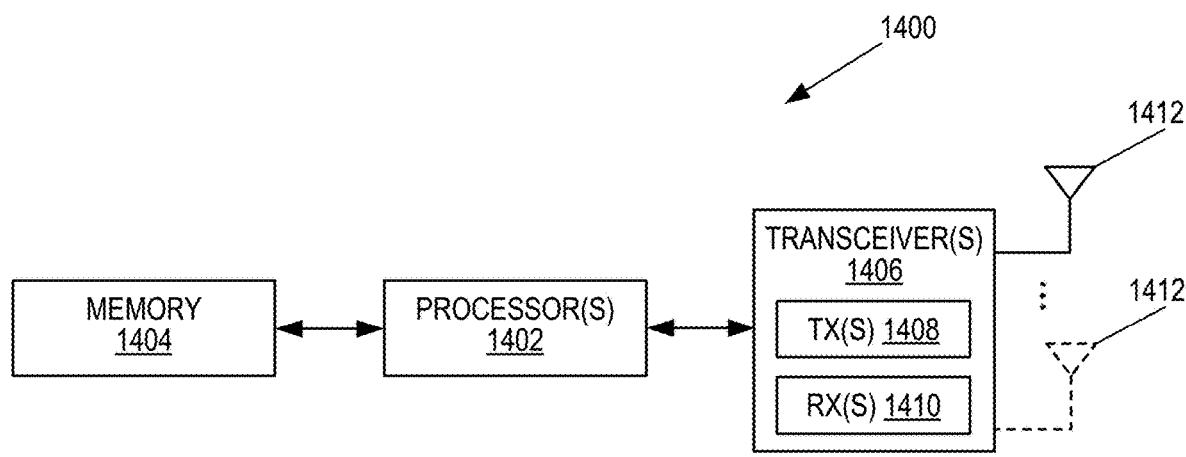
FIG. 14 is a schematic block diagram of a wireless communication device according to some embodiments of the present disclosure.

FIG. 14 is a schematic block diagram of a wireless communication device 1400 according to some embodiments of the present disclosure. As illustrated, the wireless communication device 1400 includes one or more processors 1402 (e.g., CPUs, ASICs, FPGAs, and/or the like), memory 1404, and one or more transceivers 1406 each including one or more transmitters 1408 and one or more receivers 1410 coupled to one or more antennas 1412. The transceiver(s) 1406 includes radio-front end circuitry connected to the antenna(s) 1412 that is configured to condition signals communicated between the antenna(s) 1412 and the processor(s) 1402, as will be appreciated by on of ordinary skill in the art. The processors 1402 are also referred to herein as processing circuitry. The transceivers 1406 are also referred to herein as radio circuitry. In some embodiments, the functionality of the wireless communication device 1400 described above may be fully or partially implemented in software that is, e.g., stored in the memory 1404 and executed by the processor(s) 1402. Note that the wireless communication device 1400 may include additional components not illustrated in FIG. 14 such as, e.g., one or more user interface components (e.g., an input/output interface including a display, buttons, a touch screen, a microphone, a speaker(s), and/or the like and/or any other components for allowing input of information into the wireless communication device 1400 and/or allowing output of information from the wireless communication device 1400), a power supply (e.g., a battery and associated power circuitry), etc.

In some embodiments, a computer program including instructions which, when executed by at least one processor, causes the at least one processor to carry out the functionality of the wireless communication device 1400 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
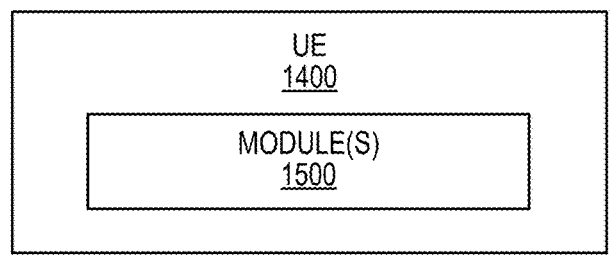
FIG. 15 is a schematic block diagram of the wireless communication device according to some other embodiments of the present disclosure.

FIG. 15 is a schematic block diagram of the wireless communication device 1400 according to some other embodiments of the present disclosure. The wireless communication device 1400 includes one or more modules 1500, each of which is implemented in software. The module(s) 1500 provide the functionality of the wireless communication device 1400 described herein.

Figure 16:
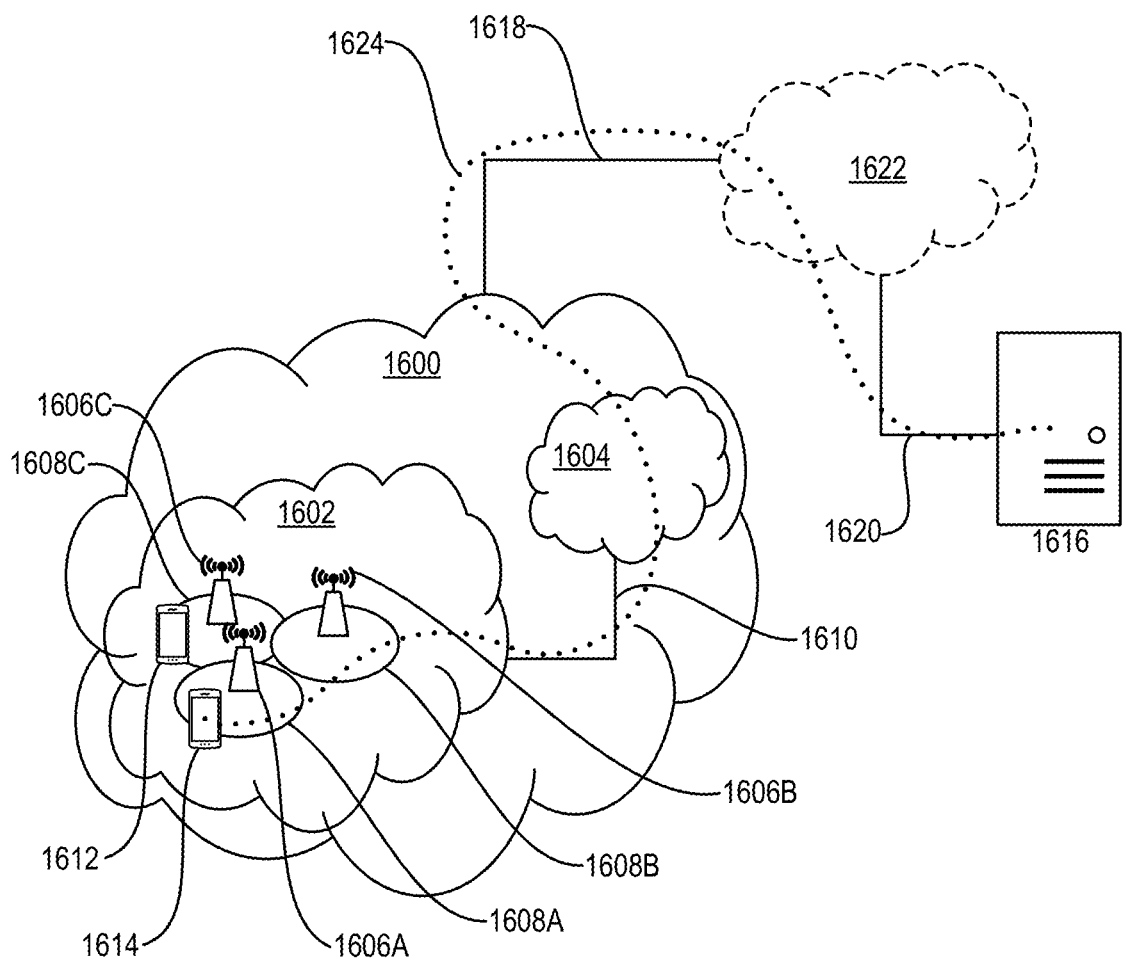
FIG. 16 illustrates a communication system which includes a telecommunication network, such as a 3GPP-type cellular network, which comprises an access network, such as a Radio Access Network (RAN), and a core network, according to some embodiments of the present disclosure.

With reference to FIG. 16, in accordance with an embodiment, a communication system includes a telecommunication network 1600, such as a 3GPP-type cellular network, which comprises an access network 1602, such as a Radio Access Network (RAN), and a core network 1604. The access network 1602 comprises a plurality of base stations 1606A, 1606B, 1606C, such as Node Bs, eNBs, gNBs, or other types of wireless Access Points (APs), each defining a corresponding coverage area 1608A, 1608B, 1608C. Each base station 1606A, 1606B, 1606C is connectable to the core network 1604 over a wired or wireless connection 1610. A first UE 1612 located in coverage area 1608C is configured to wirelessly connect to, or be paged by, the corresponding base station 1606C. A second UE 1614 in coverage area 1608A is wirelessly connectable to the corresponding base station 1606A. While a plurality of UEs 1612, 1614 are illustrated in this example, the disclosed embodiments are equally applicable to a situation where a sole UE is in the coverage area or where a sole UE is connecting to the corresponding base station 1606.

The telecommunication network 1600 is itself connected to a host computer 1616, which may be embodied in the hardware and/or software of a standalone server, a cloud-implemented server, a distributed server, or as processing resources in a server farm. The host computer 1616 may be under the ownership or control of a service provider, or may be operated by the service provider or on behalf of the service provider. Connections 1618 and 1620 between the telecommunication network 1600 and the host computer 1616 may extend directly from the core network 1604 to the host computer 1616 or may go via an optional intermediate network 1622. The intermediate network 1622 may be one of, or a combination of more than one of, a public, private, or hosted network; the intermediate network 1622, if any, may be a backbone network or the Internet; in particular, the intermediate network 1622 may comprise two or more sub-networks (not shown).

The communication system of FIG. 16 as a whole enables connectivity between the connected UEs 1612, 1614 and the host computer 1616. The connectivity may be described as an Over-the-Top (OTT) connection 1624. The host computer 1616 and the connected UEs 1612, 1614 are configured to communicate data and/or signaling via the OTT connection 1624, using the access network 1602, the core network 1604, any intermediate network 1622, and possible further infrastructure (not shown) as intermediaries. The OTT connection 1624 may be transparent in the sense that the participating communication devices through which the OTT connection 1624 passes are unaware of routing of uplink and downlink communications. For example, the base station 1606 may not or need not be informed about the past routing of an incoming downlink communication with data originating from the host computer 1616 to be forwarded (e.g., handed over) to a connected UE 1612. Similarly, the base station 1606 need not be aware of the future routing of an outgoing uplink communication originating from the UE 1612 towards the host computer 1616.

Example implementations, in accordance with an embodiment, of the UE, base station, and host computer discussed in the preceding paragraphs will now be described with reference to FIG. 17. In a communication system 1700, a host computer 1702 comprises hardware 1704 including a communication interface 1706 configured to set up and maintain a wired or wireless connection with an interface of a different communication device of the communication system 1700. The host computer 1702 further comprises processing circuitry 1708, which may have storage and/or processing capabilities. In particular, the processing circuitry 1708 may comprise one or more programmable processors, ASICs, FPGAs, or combinations of these (not shown) adapted to execute instructions. The host computer 1702 further comprises software 1710, which is stored in or accessible by the host computer 1702 and executable by the processing circuitry 1708. The software 1710 includes a host application 1712. The host application 1712 may be operable to provide a service to a remote user, such as a UE 1714 connecting via an OTT connection 1716 terminating at the UE 1714 and the host computer 1702. In providing the service to the remote user, the host application 1712 may provide user data which is transmitted using the OTT connection 1716.

The communication system 1700 further includes a base station 1718 provided in a telecommunication system and comprising hardware 1720 enabling it to communicate with the host computer 1702 and with the UE 1714. The hardware 1720 may include a communication interface 1722 for setting up and maintaining a wired or wireless connection with an interface of a different communication device of the communication system 1700, as well as a radio interface 1724 for setting up and maintaining at least a wireless connection 1726 with the UE 1714 located in a coverage area (not shown in FIG. 17) served by the base station 1718. The communication interface 1722 may be configured to facilitate a connection 1728 to the host computer 1702. The connection 1728 may be direct or it may pass through a core network (not shown in FIG. 17) of the telecommunication system and/or through one or more intermediate networks outside the telecommunication system. In the embodiment shown, the hardware 1720 of the base station 1718 further includes processing circuitry 1730, which may comprise one or more programmable processors, ASICs, FPGAs, or combinations of these (not shown) adapted to execute instructions. The base station 1718 further has software 1732 stored internally or accessible via an external connection.

The communication system 1700 further includes the UE 1714 already referred to. The UE's 1714 hardware 1734 may include a radio interface 1736 configured to set up and maintain a wireless connection 1726 with a base station serving a coverage area in which the UE 1714 is currently located. The hardware 1734 of the UE 1714 further includes processing circuitry 1738, which may comprise one or more programmable processors, ASICs, FPGAs, or combinations of these (not shown) adapted to execute instructions. The UE 1714 further comprises software 1740, which is stored in or accessible by the UE 1714 and executable by the processing circuitry 1738. The software 1740 includes a client application 1742. The client application 1742 may be operable to provide a service to a human or non-human user via the UE 1714, with the support of the host computer 1702. In the host computer 1702, the executing host application 1712 may communicate with the executing client application 1742 via the OTT connection 1716 terminating at the UE 1714 and the host computer 1702. In providing the service to the user, the client application 1742 may receive request data from the host application 1712 and provide user data in response to the request data. The OTT connection 1716 may transfer both the request data and the user data. The client application 1742 may interact with the user to generate the user data that it provides.

Figure 17:
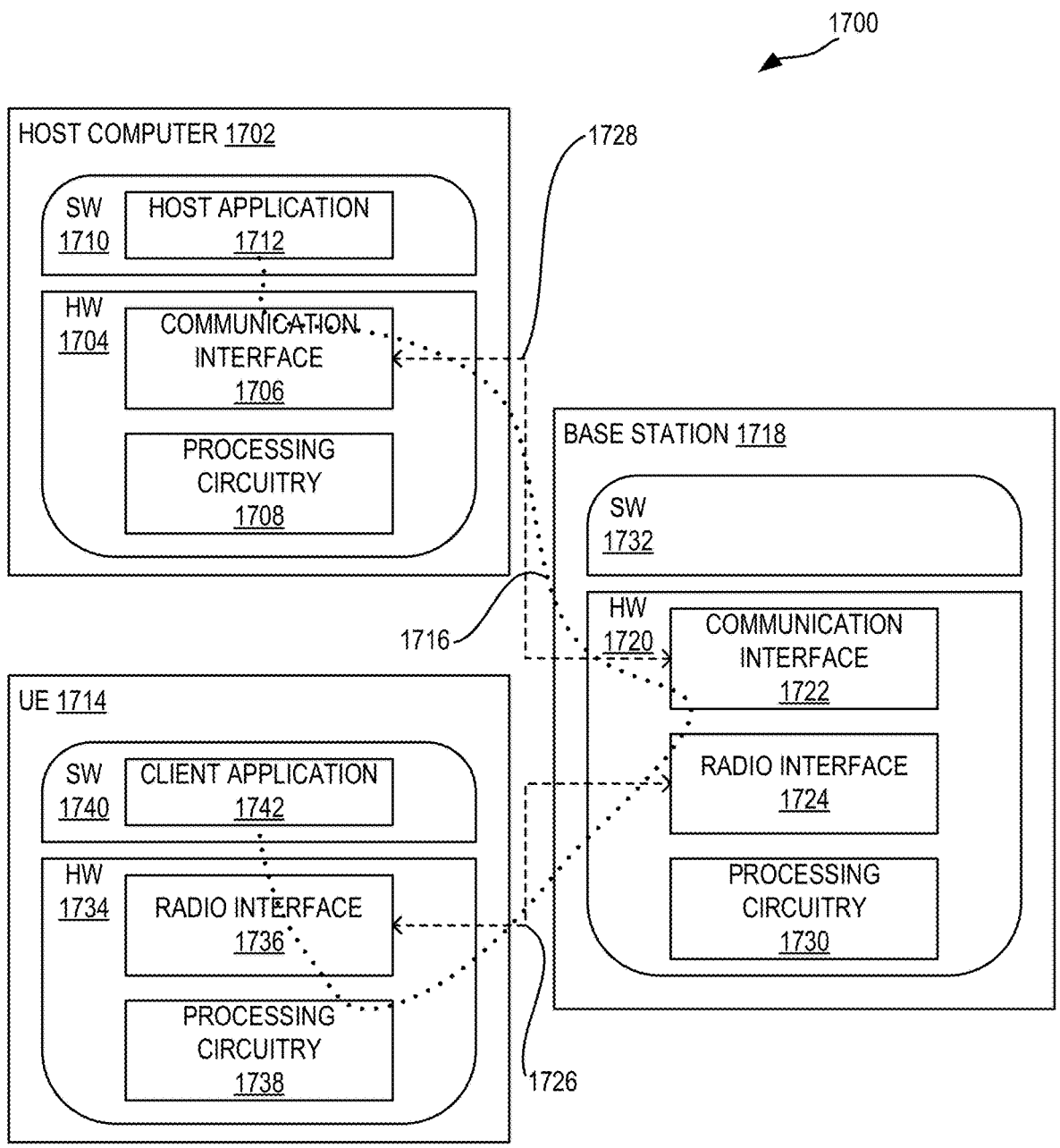
FIG. 17 illustrates a communication system, a host computer comprises hardware including a communication interface configured to set up and maintain a wired or wireless connection with an interface of a different communication device of the communication system, according to some embodiments of the present disclosure.

It is noted that the host computer 1702, the base station 1718, and the UE 1714 illustrated in FIG. 17 may be similar or identical to the host computer 1616, one of the base stations 1606A, 1606B, 1606C, and one of the UEs 1612, 1614 of FIG. 16, respectively. This is to say, the inner workings of these entities may be as shown in FIG. 17 and independently, the surrounding network topology may be that of FIG. 16.

In FIG. 17, the OTT connection 1716 has been drawn abstractly to illustrate the communication between the host computer 1702 and the UE 1714 via the base station 1718 without explicit reference to any intermediary devices and the precise routing of messages via these devices. The network infrastructure may determine the routing, which may be configured to hide from the UE 1714 or from the service provider operating the host computer 1702, or both. While the OTT connection 1716 is active, the network infrastructure may further take decisions by which it dynamically changes the routing (e.g., on the basis of load balancing consideration or reconfiguration of the network).

The wireless connection 1726 between the UE 1714 and the base station 1718 is in accordance with the teachings of the embodiments described throughout this disclosure. One or more of the various embodiments improve the performance of OTT services provided to the UE 1714 using the OTT connection 1716, in which the wireless connection 1726 forms the last segment. More precisely, the teachings of these embodiments may improve the e.g., data rate, latency, power consumption, etc. and thereby provide benefits such as e.g., reduced user waiting time, relaxed restriction on file size, better responsiveness, extended battery lifetime, etc.

A measurement procedure may be provided for the purpose of monitoring data rate, latency, and other factors on which the one or more embodiments improve. There may further be an optional network functionality for reconfiguring the OTT connection 1716 between the host computer 1702 and the UE 1714, in response to variations in the measurement results. The measurement procedure and/or the network functionality for reconfiguring the OTT connection 1716 may be implemented in the software 1710 and the hardware 1704 of the host computer 1702 or in the software 1740 and the hardware 1734 of the UE 1714, or both. In some embodiments, sensors (not shown) may be deployed in or in association with communication devices through which the OTT connection 1716 passes; the sensors may participate in the measurement procedure by supplying values of the monitored quantities exemplified above, or supplying values of other physical quantities from which the software 1710, 1740 may compute or estimate the monitored quantities. The reconfiguring of the OTT connection 1716 may include message format, retransmission settings, preferred routing, etc.; the reconfiguring need not affect the base station 1718, and it may be unknown or imperceptible to the base station 1718. Such procedures and functionalities may be known and practiced in the art. In certain embodiments, measurements may involve proprietary UE signaling facilitating the host computer 1702's measurements of throughput, propagation times, latency, and the like. The measurements may be implemented in that the software 1710 and 1740 causes messages to be transmitted, in particular empty or 'dummy' messages, using the OTT connection 1716 while it monitors propagation times, errors, etc.

FIG. 18 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 18 will be included in this section. In step 1800, the host computer provides user data. In sub-step 1802 (which may be optional) of step 1800, the host computer provides the user data by executing a host application. In step 1804, the host computer initiates a transmission carrying the user data to the UE. In step 1806 (which may be optional), the base station transmits to the UE the user data which was carried in the transmission that the host computer initiated, in accordance with the teachings of the embodiments described throughout this disclosure. In step 1808 (which may also be optional), the UE executes a client application associated with the host application executed by the host computer.

FIG. 19 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 19 will be included in this section. In step 1900 of the method, the host computer provides user data. In an optional sub-step (not shown) the host computer provides the user data by executing a host application. In step 1902, the host computer initiates a transmission carrying the user data to the UE. The transmission may pass via the base station, in accordance with the teachings of the embodiments described throughout this disclosure. In step 1904 (which may be optional), the UE receives the user data carried in the transmission.

FIG. 20 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 20 will be included in this section. In step 2000 (which may be optional), the UE receives input data provided by the host computer. Additionally or alternatively, in step 2002, the UE provides user data. In sub-step 2004 (which may be optional) of step 2000, the UE provides the user data by executing a client application. In sub-step 2006 (which may be optional) of step 2002, the UE executes a client application which provides the user data in reaction to the received input data provided by the host computer. In providing the user data, the executed client application may further consider user input received from the user. Regardless of the specific manner in which the user data was provided, the UE initiates, in sub-step 2008 (which may be optional), transmission of the user data to the host computer. In step 2010 of the method, the host computer receives the user data transmitted from the UE, in accordance with the teachings of the embodiments described throughout this disclosure.

FIG. 21 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 21 will be included in this section. In step 2100 (which may be optional), in accordance with the teachings of the embodiments described throughout this disclosure, the base station receives user data from the UE. In step 2102 (which may be optional), the base station initiates transmission of the received user data to the host computer. In step 2104 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

EMBODIMENTS

Group A Embodiments

Embodiment 1. A method performed by a wireless device for enabling feedback for multiple channels, the method comprising: receiving a timing indicator to map a data channel to a feedback channel used in the construction for a Hybrid Automatic Repeat Request (HARQ) codebook; and/or receiving a construction of a semi-static HARQ codebook based on a data channel correspondence to multiple feedback channel transmissions in a slot.

Embodiment 2. The method of any of the previous embodiments wherein receiving the timing indicator comprises receiving a Physical Downlink Shared Channel (PDSCH)-to-HARQ_feedback timing indicator (K1) used in the construction for the HARQ codebook.

Embodiment 3. The method of any of the previous embodiments wherein receiving the construction of the semi-static HARQ codebook comprises receiving the semi-static HARQ codebook based on PDSCH correspondence to multiple Physical Uplink Control Channel (PUCCH) transmissions in the slot.

Embodiment 4. The method of any of the previous embodiments wherein receiving the timing indicator comprises receiving the timing indicator based on splitting the PDSCHs into multiple groups corresponding to multiple PUCCHs.

Embodiment 5. The method of any of the previous embodiments wherein the PDSCHs that can be acknowledged within a slot are divided into multiple groups each corresponding to one Uplink (UL) sub-slot for a PUCCH transmission that is used to carry the corresponding HARQ feedback.

Embodiment 6. The method of any of the previous embodiments wherein the K1 values associated with a PUCCH in a sub-slot are determined based on the assigned PUCCH for each of the PDSCH groups.

Embodiment 7. The method of any of the previous embodiments wherein for Type I HARQ codebooks, the difference between possible maximum and minimum K1 values for PDSCHs in each group is used to determine the size of the codebook for a PUCCH transmission in a corresponding UL sub-slot.

Embodiment 8. The method of any of the previous embodiments wherein, for a number of X UL sub-slots, X Downlink (DL) time intervals are indicated to the wireless device by higher layer configurations.

Embodiment 9. The method of any of the previous embodiments wherein, for the number of X UL sub-slots, X DL time intervals are indicated to the wireless device by dynamic signaling in a downlink control information (DCI).

Embodiment 10. The method of any of the previous embodiments wherein, for the number of X UL sub-slots, X DL time intervals are indicated to the wireless device by implicit rules such as X equal DL durations for the DL slots in a Time Division Duplexing (TDD) configuration.

Embodiment 11. The method of any of the previous embodiments wherein the set of K1 values for a PUCCH is derived based on the ending time of a DL time interval and the sub-slot position of the associated PUCCH.

Embodiment 12. The method of any of the previous embodiments wherein for the number of X UL sub-slots, X sets of K1 values, each corresponding to one UL sub-slot are received by higher layer configurations.

Embodiment 13. The method of any of the previous embodiments wherein for the number of X UL sub-slots, X sets of K1 values, each corresponding to one UL sub-slot are determined by implicit rules such as all the possible K1 values are divided into X sets where each set includes a number of K1 values with consecutive K1 values in each set.

Embodiment 14. The method of any of the previous embodiments wherein the number of K1 values in a set is based on the rule, e.g., (almost) same number of K1 values in all sub-slots.

Embodiment 15. The method of any of the previous embodiments wherein, depending on the value of X, the first or last set can have smaller size as compared to the other sets.

Embodiment 16. The method of any of the previous embodiments wherein receiving the construction of the semi-static HARQ codebook comprises receiving the semi-static HARQ codebook based on PDSCHs in groups corresponding to multiple PUCCH transmissions in a slot.

Embodiment 17. The method of any of the previous embodiments wherein the wireless device could have a Time-Domain Resource Allocation (TDRA) table with more than two time-domain resource allocation entries and some of the time-domain resource allocations may overlap with each other.

Embodiment 18. The method of any of the previous embodiments wherein, for the DL slot(s) which PDSCHs are acknowledged in different UL sub-slots, the TDRA table is pruned before the HARQ codebook for a PUCCH is constructed.

Embodiment 19. The method of any of the previous embodiments wherein the timing indicator is in units of sub-slots.

Embodiment 20. The method of any of the previous embodiments, further comprising: providing user data; and forwarding the user data to a host computer via the transmission to the base station.

Group B Embodiments

Embodiment 21. A method performed by a base station for enabling feedback for multiple channels, the method comprising: determining a timing indicator to map a data channel to a feedback channel used in the construction for a Hybrid Automatic Repeat Request (HARQ) codebook; and/or constructing a semi-static HARQ codebook based on a data channel correspondence to multiple feedback channel transmissions in a slot.

Embodiment 22. The method of any of the previous embodiments wherein determining the timing indicator comprises determining Physical Downlink Shared Channel (PDSCH)-to-HARQ_feedback timing indicator ($K_1$) used in the construction for the HARQ codebook.

Embodiment 23. The method of any of the previous embodiments wherein constructing the semi-static HARQ codebook comprises constructing the semi-static HARQ codebook based on PDSCH correspondence to multiple Physical Uplink Control Channel (PUCCH) transmissions in the slot.

Embodiment 24. The method of any of the previous embodiments wherein determining the timing indicator comprises determining the timing indicator based on splitting the PDSCHs into multiple groups corresponding to multiple PUCCHs.

Embodiment 25. The method of any of the previous embodiments wherein the PDSCHs that can be acknowledged within a slot are divided into multiple groups each corresponding to one Uplink (UL) sub-slot for a PUCCH transmission that is used to carry the corresponding HARQ feedback.

Embodiment 26. The method of any of the previous embodiments wherein the $K_1$ values associated with a PUCCH in a sub-slot are determined based on the assigned PUCCH for each of the PDSCH groups.

Embodiment 27. The method of any of the previous embodiments wherein for Type I HARQ codebooks, the difference between possible maximum and minimum $K_1$ values for PDSCHs in each group is used to determine the size of the codebook for a PUCCH transmission in a corresponding UL sub-slot.

Embodiment 28. The method of any of the previous embodiments wherein, for a number of X UL sub-slots, X Downlink (DL) time intervals are indicated to the wireless device by higher layer configurations.

Embodiment 29. The method of any of the previous embodiments wherein, for a number of X UL sub-slots, X DL time intervals are indicated to the wireless device by dynamic signaling in a downlink control information (DCI).

Embodiment 30. The method of any of the previous embodiments wherein, for a number of X UL sub-slots, X DL time intervals are indicated to the wireless device by implicit rules such as X equal DL durations for the DL slots in a TDD configuration.

Embodiment 31. The method of any of the previous embodiments wherein the set of $K_1$ values for a PUCCH is derived based on the ending time of a DL time interval and the sub-slot position of the associated PUCCH.

Embodiment 32. The method of any of the previous embodiments wherein for the number of X UL sub-slots, X sets of $K_1$ values, each corresponding to one UL sub-slot are indicated to the wireless device by higher layer configurations.

Embodiment 33. The method of any of the previous embodiments wherein for the number of X UL sub-slots, X sets of $K_1$ values, each corresponding to one UL sub-slot are indicated to the wireless device by implicit rules such as all the possible $K_1$ values are divided into X sets where each set includes a number of $K_1$ values with consecutive $K_1$ values in each set.

Embodiment 34. The method of any of the previous embodiments wherein the number of $K_1$ values in a set is based on the rule, e.g., (almost) same number of $K_1$ values in all sub-slots.

Embodiment 35. The method of any of the previous embodiments wherein, depending on the value of X, the first or last set can have smaller size as compared to the other sets.

Embodiment 36. The method of any of the previous embodiments wherein constructing the semi-static HARQ codebook comprises constructing the semi-static HARQ codebook based on PDSCHs in groups corresponding to multiple PUCCH transmissions in a slot.

Embodiment 37. The method of any of the previous embodiments wherein the wireless device could have a Time-Domain Resource Allocation (TDRA) table with more than two time-domain resource allocation entries and some of the time-domain resource allocations may overlap with each other.

Embodiment 38. The method of any of the previous embodiments wherein, for the DL slot(s) which PDSCHs are acknowledged in different UL sub-slots, the TDRA table is pruned before the HARQ codebook for a PUCCH is constructed.

Embodiment 39. The method of any of the previous embodiments further comprising, assuming the DL slot is overlapped by two or more DL time intervals that are associated with different PUCCH: for each of the overlapping DL time intervals (and thus for the associated PUCCH) only time-domain resource allocations ending in this DL time interval are considered, resulting in a sub-TDRA table for each DL time interval; the sub-TDRA table is then pruned to remove entries with overlapping time-domain resource allocations and one bit is then reserved in the HARQ codebook for each remaining entry (multiple bits based on multiple TBs and CBG come on top of that).

Embodiment 40. The method of the previous embodiment wherein, for DL slots that are only overlapped by one DL time interval (i.e., all PDSCH within this DL slot are acknowledged in the same PUCCH) the TDRA table pruning algorithm as in Rel-15 can be applied.

Embodiment 41. The method of any of the previous embodiments wherein the timing indicator is in units of sub-slots.

Embodiment 42. The method of any of the previous embodiments, further comprising: obtaining user data; and forwarding the user data to a host computer or a wireless device.

Group C Embodiments

Embodiment 43. A wireless device for enabling feedback for multiple channels, the wireless device comprising: processing circuitry configured to perform any of the steps of any of the Group A embodiments; and power supply circuitry configured to supply power to the wireless device.

Embodiment 44. A base station for enabling feedback for multiple channels, the base station comprising: processing circuitry configured to perform any of the steps of any of the Group B embodiments; and power supply circuitry configured to supply power to the base station.

Embodiment 45. A User Equipment, UE, for enabling feedback for multiple channels, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 46. A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 47. The communication system of the previous embodiment further including the base station.

Embodiment 48. The communication system of the previous 2 embodiments, further including the UE, wherein the UE is configured to communicate with the base station.

Embodiment 49. The communication system of the previous 3 embodiments, wherein: the processing circuitry of the host computer is configured to execute a host application, thereby providing the user data; and the UE comprises processing circuitry configured to execute a client application associated with the host application.

Embodiment 50. A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 51. The method of the previous embodiment, further comprising, at the base station, transmitting the user data.

Embodiment 52. The method of the previous 2 embodiments, wherein the user data is provided at the host computer by executing a host application, the method further comprising, at the UE, executing a client application associated with the host application.

Embodiment 53. A User Equipment, UE, configured to communicate with a base station, the UE comprising a radio interface and processing circuitry configured to perform the method of the previous 3 embodiments.

Embodiment 54. A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 55. The communication system of the previous embodiment, wherein the cellular network further includes a base station configured to communicate with the UE.

Embodiment 56. The communication system of the previous 2 embodiments, wherein: the processing circuitry of the host computer is configured to execute a host application, thereby providing the user data; and the UE's processing circuitry is configured to execute a client application associated with the host application.

Embodiment 57. A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 58. The method of the previous embodiment, further comprising at the UE, receiving the user data from the base station.

Embodiment 59. A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 60. The communication system of the previous embodiment, further including the UE.

Embodiment 61. The communication system of the previous 2 embodiments, further including the base station, wherein the base station comprises a radio interface configured to communicate with the UE and a communication interface configured to forward to the host computer the user data carried by a transmission from the UE to the base station.

Embodiment 62. The communication system of the previous 3 embodiments, wherein: the processing circuitry of the host computer is configured to execute a host application; and the UE's processing circuitry is configured to execute a client application associated with the host application, thereby providing the user data.

Embodiment 63. The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 64. A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 65. The method of the previous embodiment, further comprising, at the UE, providing the user data to the base station.

Embodiment 66. The method of the previous 2 embodiments, further comprising: at the UE, executing a client application, thereby providing the user data to be transmitted; and at the host computer, executing a host application associated with the client application.

Embodiment 67. The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 68. A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 69. The communication system of the previous embodiment further including the base station.

Embodiment 70. The communication system of the previous 2 embodiments, further including the UE, wherein the UE is configured to communicate with the base station.

Embodiment 71. The communication system of the previous 3 embodiments, wherein: the processing circuitry of the host computer is configured to execute a host application; and the UE is configured to execute a client application associated with the host application, thereby providing the user data to be received by the host computer.

Embodiment 72. A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 73. The method of the previous embodiment, further comprising at the base station, receiving the user data from the UE.

Embodiment 74. The method of the previous 2 embodiments, further comprising at the base station, Initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
ACK Acknowledgement
AP Access Point
ARQ Automatic Repeat Request
ASIC Application Specific Integrated Circuit
CBG Code Block Group
CPU Central Processing Unit
DAI Downlink Assignment Indicator
DCI Downlink Control Information
DL Downlink
DN Data Network
DSP Digital Signal Processor
eMBB Enhanced Mobile Broadband
eNB Enhanced or Evolved Node B
FPGA Field Programmable Gate Array
gNB New Radio Base Station
HARQ Hybrid Automatic Repeat Request
LTE Long Term Evolution
MME Mobility Management Entity
MTC Machine Type Communication
NACK Negative Acknowledgement
NEF Network Exposure Function
NF Network Function
NR New Radio
NSSF Network Slice Selection Function
OFDM Orthogonal Frequency Division Multiplexing
OTT Over-the-Top
PDCCH Physical Downlink Control Channel
PDSCH Physical Downlink Shared Channel
P-GW Packet Data Network Gateway
PRI PUCCH Resource Indicator
PUCCH Physical Uplink Control Channel
RAM Random Access Memory
RAN Radio Access Network
RNTI Radio Network Temporary Identifier
ROM Read Only Memory
RRH Remote Radio Head
SCEF Service Capability Exposure Function
TB Transport Block
TDD Time Division Duplexing
TDRA Time-Domain Resource Allocation
UE User Equipment
UL Uplink
URLLC Ultra-Reliable Low Latency Communication Those skilled in the art will recognize improvements and modifications to the embodiments of the present disclosure. All such improvements and modifications are considered within the scope of the concepts disclosed herein.

What is claimed is:

1. A method performed by a base station for constructing, for a wireless device, a semi-static Hybrid Automatic Repeat Request, HARQ, codebook for each of multiple Physical Uplink Control Channel, PUCCH, resources in an uplink slot, each of the multiple PUCCH resources carrying HARQ feedback for Physical Downlink Shared Channel, PDSCH, transmissions within a certain downlink time interval, the method comprising:

based on a Time Domain Resource Allocation, TDRA, table comprising a list of TDRA entries configured for the wireless device, determining a sub-TDRA table for each downlink time interval comprising entries of the TDRA table with a TDRA ending in the downlink time interval;

pruning each sub-TDRA table to remove entries with overlapping TDRAs;

constructing a semi-static HARQ codebook for each pruned sub-TDRA table based on the remaining entries in the pruned sub-TDRA tables; and using the semi-static HARQ codebooks for receiving HARQ feedback in the uplink slot.

2. The method of claim 1 further comprising:
reserving one bit in the semi-static HARQ codebook for each remaining entry of each sub-TDRA table.

3. The method of claim 1 further comprising:
reserving multiple bits in the semi-static HARQ codebook based on multiple Transport Blocks, TBs, and Code-Block Groups, CBGs.

4. The method of claim 1 wherein pruning each sub-TDRA table comprises:
for the downlink slots that are only overlapped by one DL time interval, the TDRA table pruning algorithm as in Rel-15 can be applied pruning each sub-TDRA table.

5. The method of claim 1 wherein constructing each semi-static HARQ codebook comprises constructing each semi-static HARQ codebook based on the PDSCH correspondence to the multiple PUCCH transmissions in the slot.

6. The method of claim 1 wherein constructing each semi-static HARQ codebook further comprises dividing the PDSCHs that can be acknowledged within the slot into multiple groups each corresponding to one uplink sub-slot for a PUCCH transmission that is used to carry the corresponding HARQ feedback.

7. A method performed by a wireless device for enabling feedback for multiple Physical Downlink Shared Channel, PDSCH, transmissions, the method comprising:

constructing a semi-static Hybrid Automatic Repeat Request, HARQ, codebook for each of multiple Physical Uplink Control Channel, PUCCH, resources in an uplink slot, each of the multiple PUCCH resources carrying HARQ feedback for Physical Downlink Shared Channel, PDSCH, transmissions within a certain downlink time interval, wherein each semi-static HARQ codebook is constructed based on remaining entries in a pruned sub-Time Domain Resource Allocation, TDRA, table, the sub-TDRA table being determined for one of the downlink time intervals to comprise entries of a TDRA table with a TDRA ending in the downlink time interval, the TDRA table being configured for the wireless device; and the pruned sub-TDRA table being pruned to remove entries with overlapping TDRAs; and transmitting, to the base station, feedback for multiple PDSCH transmissions based on the semi-static HARQ codebooks.

8. The method of claim 7 wherein each semi-static HARQ codebook is constructed by reserving one bit in the semi-static HARQ codebook for each remaining entry of the pruned sub-TDRA table.

9. The method of claim 7 wherein each semi-static HARQ codebook is constructed by reserving multiple bits in the semi-static HARQ codebook based on multiple Transport Blocks, TBs, and Code-Block Groups, CBGs.

10. The method of claim 7 wherein, for the downlink slots that are only overlapped by one downlink time interval, the TDRA table pruning algorithm as in Rel-15 is applied to each sub-TDRA table.

11. The method of claim 7 wherein each semi-static HARQ codebook is constructed based on the PDSCH correspondence to the multiple PUCCH transmissions in the slot.

12. The method of claim 7 wherein the each semi-static HARQ codebook further comprises: the PDSCHs that can be acknowledged within a slot are divided into multiple groups each corresponding to one Uplink sub-slot for a PUCCH transmission that is used to carry the corresponding HARQ feedback.

13. A base station for constructing, for a wireless device, a semi-static Hybrid Automatic Repeat Request, HARQ, codebook for each of multiple Physical Uplink Control Channel, PUCCH, resources in an uplink slot, each of the multiple PUCCH resources carrying HARQ feedback for Physical Downlink Shared Channel, PDSCH, transmissions within a certain downlink time interval, the base station comprising:
one or more processors; and
memory comprising instructions to cause the base station to:
based on a Time Domain Resource Allocation, TDRA, table comprising a list of TDRA entries configured for the wireless device, determine a sub-TDRA table for each downlink time interval comprising entries of the TDRA table with a TDRA ending in the downlink time interval;
prune each sub-TDRA table to remove entries with overlapping TDRAs;
construct a semi-static HARQ codebook for each pruned sub-TDRA table based on the remaining entries in the pruned sub-TDRA tables; and
using the semi-static HARQ codebooks for HARQ feedback in the uplink slot.

14. The base station of claim 13 further comprising instructions to cause the base station to:
reserve one bit in the semi-static HARQ codebook for each remaining entry of each sub-TDRA table.

15. The base station of claim 13 further comprising instructions to cause the base station to:
reserve multiple bits in the semi-static HARQ codebook based on multiple Transport Blocks, TBs, and Code-Block Groups, CBGs.

16. The base station of claim 13 wherein pruning each sub-TDRA table comprises instructions to cause the base station to:
for the downlink slots that are only overlapped by one DL time interval, the TDRA table pruning algorithm as in Rel-15 can be applied pruning each sub-TDRA table.

17. A wireless device for enabling feedback for multiple Physical Downlink Shared Channel, PDSCH, channels, the wireless device comprising:
one or more processors; and
memory storing instructions executable by the one or more processors, whereby the wireless device is operable to:
constructing a semi-static Hybrid Automatic Repeat Request, HARQ, codebook for each of multiple Physical Uplink Control Channel, PUCCH, resources in an uplink slot, each of the multiple PUCCH resources carrying HARQ feedback for Physical Downlink Shared Channel, PDSCH, transmissions within a certain downlink time interval; where each semi-static HARQ codebook is constructed based on remaining entries in a pruned sub-Time Domain Resource Allocation, TDRA, table, the sub-TDRA table being determined for one of the downlink time intervals to comprise entries of a TDRA table with a TDRA ending in the downlink time interval, the TDRA table being configured for the wireless device; and the pruned sub-TDRA table being pruned to remove entries with overlapping TDRAs; and
transmit, to the base station, feedback for multiple data channels based on the semi-static HARQ codebooks.

18. The wireless device of claim 17 wherein each semi-static HARQ codebook is constructed by reserving one bit in the semi-static HARQ codebook for each remaining entry of the pruned sub-TDRA table.

19. The wireless device of claim 17 wherein each semi-static HARQ codebook is constructed by reserving multiple bits in the semi-static HARQ codebook based on multiple Transport Blocks, TBs, and Code-Block Groups, CBGs.

20. The wireless device of claim 17 wherein, for the downlink slots that are only overlapped by one downlink time interval, the TDRA table pruning algorithm as in Rel-15 is applied to each sub-TDRA table.

* * * * *